US009992389B1

(12) United States Patent
Fu et al.

(10) Patent No.: US 9,992,389 B1
(45) Date of Patent: Jun. 5, 2018

(54) UNIVERSAL WALL/CEILING-PLATE WITH SECURITY CAMERA

(71) Applicant: Kuna Systems Corporation, Burlingame, CA (US)

(72) Inventors: Sai-Wai Fu, Los Altos, CA (US); Haomiao Huang, Redwood City, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days. days.

(21) Appl. No.: 15/214,866

(22) Filed: Jul. 20, 2016

Related U.S. Application Data

(63) Continuation of application No. 14/859,867, filed on Sep. 21, 2015, now Pat. No. 9,654,678, and a
(Continued)

(51) Int. Cl.
*H04N 5/225* (2006.01)
*H04N 5/232* (2006.01)
(Continued)

(52) U.S. Cl.
CPC ....... *H04N 5/2252* (2013.01); *F21V 23/0435* (2013.01); *F21V 23/06* (2013.01);
(Continued)

(58) Field of Classification Search
CPC ............. H04N 5/2252; H04N 5/23241; G03B 11/045; F21V 23/0435; F21V 23/06; F21V 33/0056
See application file for complete search history.

(56) References Cited

U.S. PATENT DOCUMENTS 8,562,158 B2 * 10/2013 Chien ................... F21V 19/00
362/276
8,711,216 B2 * 4/2014 Chien ................... H04N 5/2354
348/142
(Continued)

OTHER PUBLICATIONS

Van Walree, P., "Lens Hoods", http://toothwalker.org/optics/lenshood.html, 2002, 6 pages.
(Continued)

*Primary Examiner* — Gevell Selby
(74) *Attorney, Agent, or Firm* — Christopher P. Maiorana, PC

(57) ABSTRACT

An apparatus comprising a power adapter, a security camera portion and a socket adapter. The power adapter may be configured to receive an AC power source and generate DC power. The security camera may be configured to receive DC power from the power adapter. The socket adapter may comprise a first connector a second connector and a third connector. A camera module may be integrated in a cavity of the security camera portion. The power adapter may be within the socket adapter. The first connector may be removably connected to a light bulb and the second connector may be removably connected to a light fixture. The power adapter may receive the AC power source from an electrical connection to the light fixture. The security camera may be configured to connect to the third connector to receive the DC power.

16 Claims, 14 Drawing Sheets

Related U.S. Application Data continuation of application No. 14/164,540, filed on Jan. 27, 2014, now Pat. No. 9,143,741, which is a continuation-in-part of application No. 13/921,597, filed on Jun. 19, 2013, now Pat. No. 9,172,917, and a continuation of application No. 14/205,946, filed on Mar. 12, 2014, now Pat. No. 9,542,832, and a continuation of application No. 14/519,642, filed on Oct. 21, 2014, and a continuation of application No. 14/504,632, filed on Oct. 2, 2014, which is a continuation of application No. 14/664,275, filed on Mar. 20, 2015, now Pat. No. 9,726,338.

(60) Provisional application No. 61/790,865, filed on Mar. 15, 2013, provisional application No. 61/783,474, filed on Mar. 14, 2013, provisional application No. 61/684,310, filed on Aug. 17, 2012, provisional application No. 61/923,931, filed on Jan. 6, 2014, provisional application No. 61/783,565, filed on Mar. 14, 2013, provisional application No. 61/902,943, filed on Nov. 12, 2013, provisional application No. 62/166,968, filed on May 27, 2015, provisional application No. 62/197,322, filed on Jul. 27, 2015, provisional application No. 62/240,862, filed on Oct. 13, 2015, provisional application No. 62/328,827, filed on Apr. 28, 2016.

(51) Int. Cl.
*F21V 23/06* (2006.01)
*F21V 33/00* (2006.01)
*F21V 23/04* (2006.01)
*G03B 11/04* (2006.01)

(52) U.S. Cl.
CPC ........ *F21V 33/0056* (2013.01); *G03B 11/045* (2013.01); *H04N 5/23241* (2013.01)

(56) References Cited

U.S. PATENT DOCUMENTS

2003/0210340 A1* 11/2003 Frederick Romanowich ............ G08B 13/19632 348/272
2013/0129338 A1* 5/2013 Dowell .............. G02B 27/0006 396/448
2014/0055611 A1 2/2014 Wong et al. .................. 348/143

OTHER PUBLICATIONS

Brown, R., "Chamberlain Goes From Garage to Front Door with Notifi Video Door Chime", http://www.cnet.com/products/chamberlain-notifi-video-door-chime/preview/, Jan. 3, 2015, 4 pages.

\* cited by examiner

UNIVERSAL WALL/CEILING-PLATE WITH SECURITY CAMERA

This application relates to U.S. Ser. No. 14/859,867, filed Sep. 21, 2015, which relates to U.S. Ser. No. 14/164,540, filed Jan. 27, 2014, now U.S. Pat. No. 9,143,741, which relates to U.S. Ser. No. 13/921,597, filed Jun. 19, 2013, now U.S. Pat. No. 9,172,917 which relates to (i) U.S. Provisional Application No. 61/790,865, filed Mar. 15, 2013, (ii) U.S. Provisional Application No. 61/783,474, filed Mar. 14, 2013, and (iii) U.S. Provisional Application No. 61/684,310, filed Aug. 17, 2012. U.S. Ser. No. 14/164,540, filed Jan. 27, 2014, now U.S. Pat. No. 9,143,741 also relates to U.S. Provisional Application No. 61/923,931, filed Jan. 6, 2014. U.S. Ser. No. 14/859,867, filed Sep. 21, 2015, also relates to U.S. Ser. No. 14/205,946, filed Mar. 12, 2014, which relates to U.S. Provisional Application No. 61/783,565, filed Mar. 14, 2013. U.S. Ser. No. 14/859,867, filed Sep. 21, 2015, also relates to U.S. Ser. No. 14/519,642, filed Oct. 21, 2014, which relates to U.S. Provisional Application No. 61/902,943, filed Nov. 12, 2013. U.S. Ser. No. 14/859,867, filed Sep. 21, 2015, also relates to U.S. Ser. No. 14/504,632, filed Oct. 2, 2014. U.S. Ser. No. 14/859,867, filed Sep. 21, 2015, also relates to U.S. application Ser. No. 14/664,275, filed Mar. 20, 2015. U.S. Ser. No. 14/859,867, filed Sep. 21, 2015, also relates to U.S. Provisional Application No. 62/166,968, filed May 27, 2015. U.S. Ser. No. 14/859,867, filed Sep. 21, 2015, also relates to U.S. Provisional Application No. 62/197,322, filed Jul. 27, 2015.

This application also relates to (i) U.S. Provisional Application No. 62/197,322, filed Jul. 27, 2015, (ii) U.S. Provisional Application No. 62/240,862, filed Oct. 13, 2015 and (iii) U.S. Provisional Application No. 62/328,827, filed Apr. 28, 2016. Each of the mentioned applications are hereby incorporated by reference in their entirety.

FIELD OF THE INVENTION

The present invention relates to smart lighting generally and, more particularly, to a method and/or apparatus for implementing a universal wall/ceiling-plate with security camera.

BACKGROUND OF THE INVENTION

A new kind of smart security light has become available that lets users see and talk to a visitor at a door by using a cell phone anywhere that a cellular or Wi-Fi signal is available. A smart security light can be integrated with a new light fixture to replace an existing wall-mounted light fixture. New smart security lights provide an elegant solution for users who would like a new light fixture and like the designs offered.

There are four disadvantages of the current technology of replacing an existing light fixture with a new integrated smart security light. First, many users do not want to replace existing light fixtures. Second, some users prefer the design of other new light fixtures to the designs offered in the new smart security light integrated solutions. Third, many users have ceiling lights at the front door and would not be able to benefit from the integrated wall-mount smart security light. Fourth, integrated smart security lights have custom designed glare shields for each light fixture design. The custom designed glare shield might not work well with other styles of glass enclosures as stray light might come from many more directions towards the camera lens.

It would be desirable to implement universal wall/ceiling-plate with security camera.

SUMMARY OF THE INVENTION

The present invention concerns an apparatus comprising a power adapter, a security camera portion and a socket adapter. The power adapter may be configured to receive an AC power source and generate DC power. The security camera may be configured to receive DC power from the power adapter. The socket adapter may comprise a first connector a second connector and a third connector. A camera module may be integrated in a cavity of the security camera portion. The power adapter may be within the socket adapter. The first connector may be removably connected to a light bulb and the second connector may be removably connected to a light fixture. The power adapter may receive the AC power source from an electrical connection to the light fixture. The security camera may be configured to connect to the third connector to receive the DC power.

The objects, features and advantages of the present invention include providing a universal wall/ceiling-plate with security camera that may (i) provide a retrofit for existing light fixtures, (ii) provide temporary installation for testing purposes, (iii) reduce glare from stray light, (iv) provide a wall-mount installation, (v) provide a ceiling-mount installation, (vi) provide an adjustable mount to accommodate various light fixture lengths, (vii) provide a power adapter to supply both an AC and a DC power supply, (viii) provide a smart socket adapter with an integrated power adapter and/or (ix) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
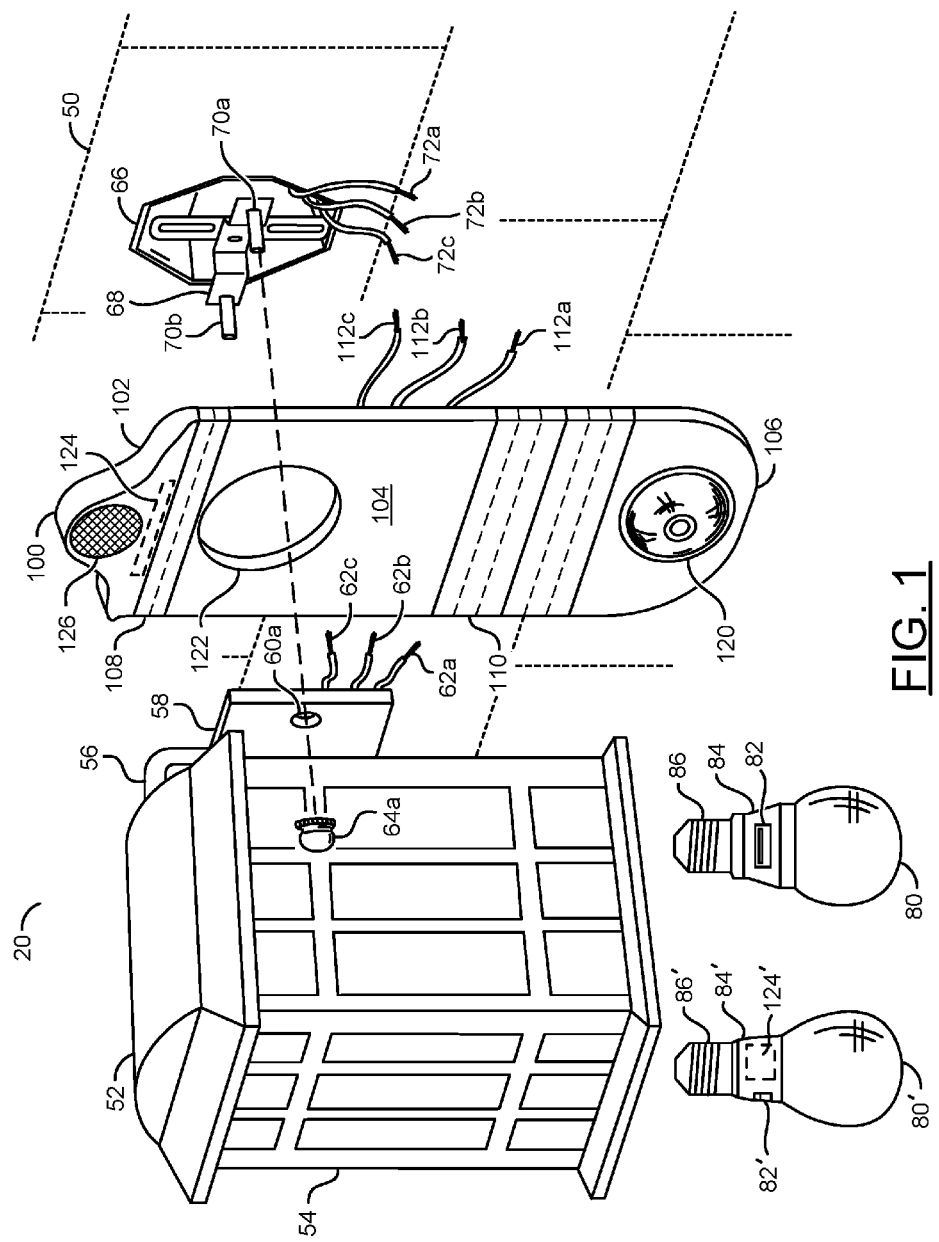
FIG. 1 is a diagram illustrating an apparatus mounting a light fixture to an electrical box.

Referring to FIG. 1, a diagram of an example installation 20 illustrating an apparatus 100 for mounting a light fixture 52 to an electrical box 66 is shown. The example installation 20 may comprise a wall 50, the light fixture 52, the apparatus 100 and the electrical box (e.g., junction box) 66. The junction box 66 may be located in the wall 50. The light fixture 52 may comprise a shade 54, a connector 56, a wall-mount plate 58, a mounting hole 60a, fixture wires 62a-62c, a locking nut 64a, and a light bulb 80. The junction box 66 may comprise a bracket 68, mounting screws 70a-70b and power supply wires 72a-72c.

The shade 54 of the light fixture 52 may be attached to the wall mounting plate 58 (e.g., connected by the connector 56). In one example, the wall plate 58 may be approximately 0.5 inches deep and the width may be 8 inches. The wall plate 58 may have the mounting holes 60a-60b to mount the light fixture 52 to the mounting bracket 68 of the junction box 66 using the mounting screws 70a-70b. The mounting screws 70a-70b may be covered by the decorative locking nuts 64a-64b.

The light bulb 80 may be installed in the light fixture 52. The light bulb 80 is shown having a port (or receptacle) 82. The port 82 may be implemented as a Universal Serial Bus (USB) port. The shade 54 may be implemented to diffuse light emitted by the light bulb 80 and/or protect the light bulb 80. The light emitted by the light bulb 80 may reflect off an interior of the shade 54 (e.g., scatter the emitted light causing one example of stray light). The shade 54 may be a diffusing medium. In an example, the shade 54 may be a glass material and/or a diffused plastic material. The shade 54 may be colored and/or clear. The implementation of the shade 54 may be varied according to the design criteria of a particular implementation.

The light bulb 80 may comprise a base 84 and a connector 86. The light bulb base 84 may comprise electronics for the light bulb 80. In some embodiments, the light bulb base 84 may comprise a heat sink. The connector 86 may be implemented to connect the light bulb 80 to a light bulb socket in the light fixture 52. For example, the connector 302 may be a standard screw-in base. The connector 86 may be a male connector for a female receptacle in the light fixture 52. The type of connector 86 implemented may be varied according to the design criteria of a particular implementation.

Fixture wires 62a-62c are shown extending from the wall plate 58. The fixture wires 62a-62c may be pre-existing connectors from the light fixture 52 (e.g., wires provided with the light fixture 52) used to connect a power supply to the light fixture 52 (e.g., provide power to the light bulb 80). In an example, the fixture wires 62a-62c may be housed within a channel of the connector 56 to connect a power source for a light socket to a power supply.

Portions of the apparatus 100 may be clamped between the wall plate 58 and the mounting bracket 68 through the action of the two mountings screws 70a-70b. The apparatus 100 may be configured to attach to the mounting bracket 68 of the junction box 66. The bracket 68 may be removably attached to the junction box 66. The bracket 68 may provide support for the light fixture 52 and/or the apparatus 100.

The mounting screws 70a-70b may be removably attached to the bracket 68. A length of extension of the mounting screws 70a-70b from the bracket 68 may be adjusted. For example, the length of extension of the mounting screws 70a-70b may be adjusted to accommodate wall mount bases having varying sizes and/or the depth of the apparatus 100. While two mounting screws 70a and 70b are shown, the particular number of mounting screws may be varied to meet the design criteria of a particular implementation. For example, a heavier fixture may need more screws. The mounting screws 70a-70b may be configured to support the light fixture 52 and/or the apparatus 100.

Power supply wires 72a-72c are shown extending from the junction box 66. The power supply wires 72a-72c may be pre-existing connectors to a power supply of the premises (e.g., standard household wiring) used to connect a power supply to various electrical devices. The power supply wires 72a-72c may provide power (e.g., an AC supply) to the apparatus 100 and/or the light fixture 52.

The apparatus 100 may comprise a top portion 102, a middle portion 104 and a bottom portion 106. The apparatus 100 may further comprise a top telescoping portion 108 and a bottom telescoping portion 110. The top telescoping portion 108 may be between the top portion 102 and the middle portion 104. The bottom telescoping portion 110 may be between the middle portion 104 and the bottom portion 106.

The apparatus 100 may comprise adapter wires 112a-112c, a lens module 120, an opening 122, a power adapter 124 and/or a speaker 126. In an example, the middle portion 104 may comprise the opening 122 and the adapter wires 112a-112c may extend from the middle portion 104. In another example, the bottom portion 106 may comprise the lens module 120 and the lens module 120 may be positioned below the shade 54 of the light fixture 52. In yet another example, the top portion 102 may comprise the power adapter 124 and the speaker 126. Each of the components may be implemented as a component of any of the top portion 102, the middle portion 104 and/or the bottom portion 106. The arrangement of the components of the apparatus 100 may be varied according to the design criteria of a particular implementation.

The apparatus 100 may be clamped between the light fixture wall mount plate 58 and the mounting bracket 68 through the action of the two mountings screws 70a-70b extending through the opening 122 and then through the mounting holes 60a-60b. The apparatus 100 may be configured to use the existing mounting bracket 68 inside the junction box 66 for support. The mounting screws 70a-70b may extend through the mounting holes 60a-60b. The locking nut 64a may removably attach to the mounting screw 70a to prevent the wall plate 58 from slipping off the mounting screw 70a. Similarly, a locking nut (e.g., a locking nut 64b, not shown) may removably attach to the mounting screw 70b. The locking caps 64a-64b may further provide a decorative function. The decorative function of the locking caps 64a-64b may be to hide the mounting screws 70a-70b from view.

The middle portion 104 may provide one or more channels for the adapter wires 112a-112c. The middle portion 104 may be as thin as possible to avoid a bulky look. In an example, the channel(s) may provide a path from the power adapter 124 to a backside of the apparatus 100. The adapter wires 112a-112c may connect to the fixture wires 62a-62c and/or the power supply wires 72a-72c. The power adapter 124 may be configured to connect to a source providing AC power (e.g., the power supply wires 72a-72c). The power supply wires 72a-72c may be used to provide AC power (e.g., high voltage) to/from the power adapter 124.

The power adapter 124 may use the adapter wires 112a-112c to transmit AC power between the power source wires 72a-72c (e.g., from the electrical box 66) and the light fixture wires 62a-62c. For example, the wires 72a-72c may provide a hot, neutral, return, ground, etc. The adapter wires 112a-112c may connect to the fixture wires 62a-62c to provide power to the light bulb 80 and/or control signals for the light bulb 80 (e.g., to control powering on/off the light bulb 80, to adjust a dimming of the light bulb 80, to adjust a color of the light bulb 80, etc.). The connections between the fixture wires 62a-62c, the power supply wires 72a-72c and/or the adapter wires 112a-112c may be varied according to the design criteria of a particular implementation.

In some embodiments, the power adapter 124 is shown implemented inside a top portion 102 (e.g., a decorative enclosure) of the apparatus 100. In an example, the power adapter 124 may be 50 mm×30 mm×30 mm. The top portion 102 may further comprise the speaker 126. The speaker 126 may be powered by the power adapter 124.

In some embodiments, the light bulb 80' may be implemented. The light bulb 80' may comprise the power adapter 124'. The power adapter 124' located in a light bulb base 84' may be implemented instead of the power adapter 124 in the top portion 102 of the apparatus 100. The light bulb 80' may receive an AC power supply from a conventional light socket inside the light fixture 52 (e.g., via an electrical connection from the fixture wires 62a-62c that may connect to the power supply wires 72a-72c). The power adapter 124' may convert the AC power supply to a DC power supply. The power adapter 124' may provide a DC power supply output to the port 82'. In an example, a USB connector may connect to the port 82' to provide DC power to an external device. In one example, the port 82' may be used to provide DC power to the lens module 120.

The light bulb 80' may comprise the smart socket adapter 84' and the connector 86'. In some embodiments, the smart socket adapter 84' may contain the power adapter 124' and/or electronics for the light bulb 80'. In some embodiments, the smart socket adapter 84' may comprise the power adapter 124' and the light bulb 80' may screw into the smart socket adapter 84'. Details of the smart socket adapter 84' may be described in more detail in association with FIGS. 11-14.

The apparatus 100 may provide an easy way to install an Internet-connected security camera and a 2-way intercom to a standard light fixture (e.g., the light fixture 52). The light fixture 52 may be wall-mounted or ceiling-mounted. The apparatus 100 may comprise the AC power adapter 124, the Internet-connected security camera module 120 and/or a thin plate adapter (e.g., the middle portion 104). Optionally, the apparatus 100 may comprise the speaker 126. The speaker 126 may implement a 2-way intercom (e.g., the speaker 126 may comprise a speaker and a microphone). The plate adapter 104 may fit between the standard light fixture 52 and the wall 50 (or the ceiling). The components of the apparatus 100 (e.g., the AC power adapter 124, the camera module 120 and/or the plate adapter 104) may be integrated into one single piece for many wall-mounted light fixtures, or may be separated into 2 or more components (e.g., the top portion 102, the middle portion 104 and the bottom portion 106).

The apparatus 100 may implement the adapter plate 104 as one unit and/or as separate components. The apparatus 100 may sit between the standard light fixture 52 (wall mounted or ceiling mounted) and the electrical junction box 66 in the wall (or the ceiling) 50. Where the components and/or electronics of the apparatus 100 (e.g., the AC power adapter 124, the speaker(s) 126, the Internet-connected camera module 120, etc.) are placed may be varied according to the design criteria of a particular implementation.

The apparatus 100 may be an aesthetically pleasing way to implement a security camera with various light fixture styles. By breaking the apparatus 100 up into 3 components (e.g., the power adapter 124, the camera module 120 and/or the plate adapter 104) the apparatus 100 may enable the functionality of a security camera and be installed with a light fixture that is already owned and/or installed (e.g., retrofit).

Figure 2:
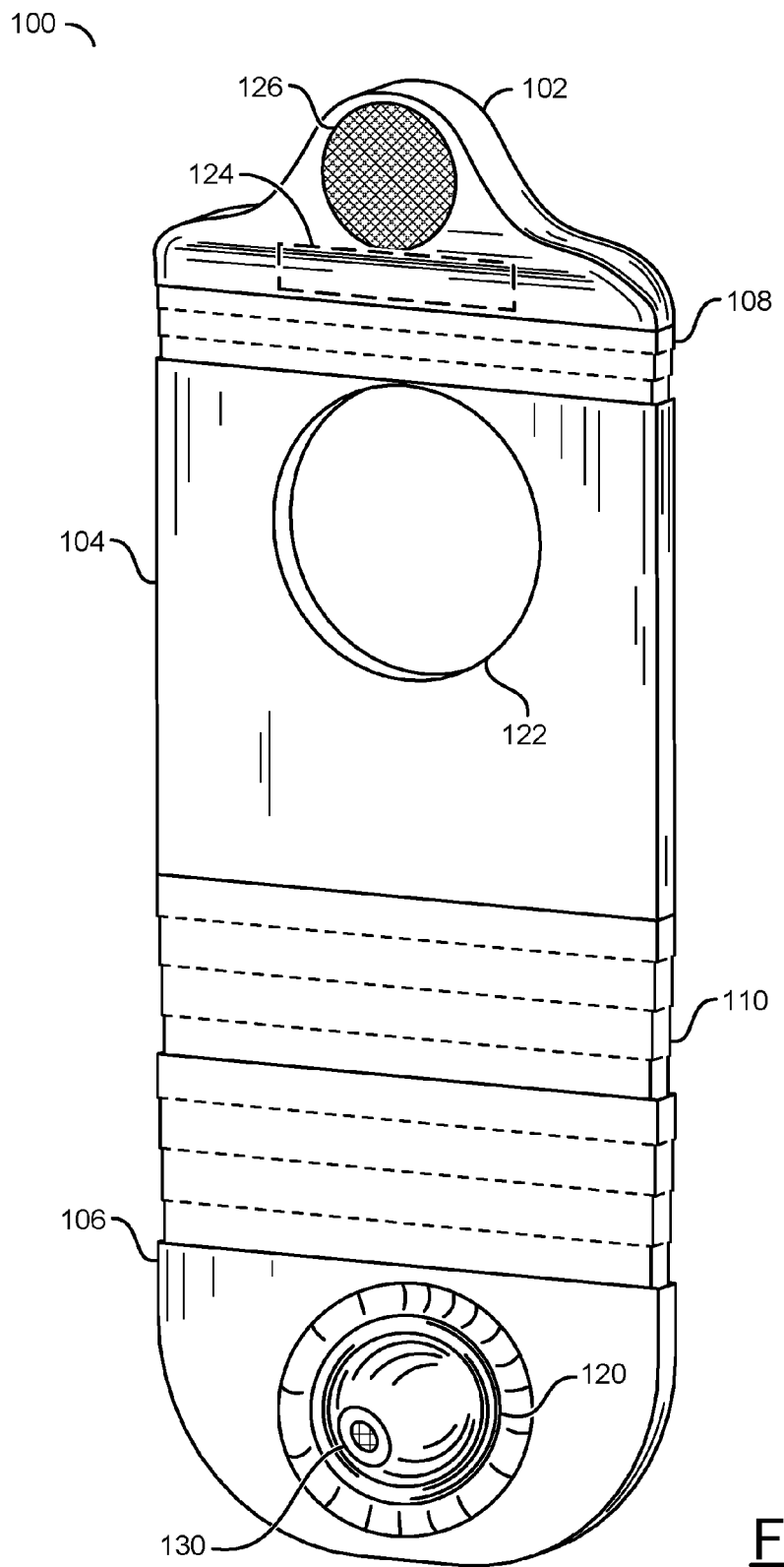
FIG. 2 is a diagram illustrating an example embodiment of the apparatus with an extended base.

Referring to FIG. 2, an example embodiment of the apparatus 100 with an extended base is shown. The top portion 102 is shown comprising the power adapter 124 and the speaker 126. Other components may be implemented in the top portion 102. In some embodiments, the top portion 102 may be 1 inch deep. The speaker 126 may be 2 inches in diameter. The top portion 102 may be designed to provide a decorative function.

The top telescoping portion 108 is shown partially extended. The top telescoping portion 108 may extend to create a distance between the top portion 102 and the middle portion 104. In the example shown, the top telescoping portion 108 may be extended further or may be closed to abut the middle portion 104. For example, the top telescoping portion 108 may be adjustable from 0 to 3 inches. The top telescoping portion 108 may comprise a number of segments configured to nest within a next segment to implement the telescoping function. Other telescoping methods may be implemented. In an example, the top telescoping portion 108 may comprise slider bracket and/or a guide to adjust the length of the top telescoping portion 108.

The middle portion 104 may be 0.5 inches deep. The depth of the middle portion 104 may be a small size to ensure that the mounting screws 70a-70b extend through the opening 122 and through the fixture wall-plate 58. In one example, the middle portion 104 may have a smaller depth than the top portion 102 and/or the bottom portion 106. The depth of the middle portion 104 may be designed such that when the fixture base 58 is clamped to the middle portion 104, the fixture wall-plate 58 fits flush against the top portion 102 and/or the bottom portion 106. The dimensions of the middle portion 104 may be varied according to the design criteria of a particular implementation.

The opening 122 implemented in the middle portion 104 may be approximately the same size (e.g., 4 inches in diameter) of a standard junction box (e.g., the junction box 66 shown in FIG. 1). The opening 122 may be used for mounting the light fixture 52. For example, the light fixture 52 may be mounted to the plate adapter 104 using the light fixture wall-mount plate 58 and the mounting screws 70a-70b from the junction box 66 (e.g., the apparatus 100 may be clamped between the junction box 66 and the light fixture plate 58).

The bottom telescoping portion 110 is shown fully extended. The bottom telescoping portion 110 may extend to create a distance between the middle portion 104 and the bottom portion 106. In the example shown, the top telescoping portion 108 may be collapsed to decrease the distance between the middle portion 104 and the bottom portion 106 or may be closed to abut the middle portion 104 against the bottom portion 106. For example, the bottom telescoping portion 110 may be adjustable from 0 to 6 inches. The bottom telescoping portion 110 may comprise a number of segments configured to nest within a next segment to implement the telescoping function. Other telescoping methods may be implemented. In an example, the bottom telescoping portion 110 may comprise slider bracket and/or a guide to adjust the length of the bottom telescoping portion 110.

The bottom portion 106 is shown comprising the lens module 120. A lens 130 is shown on the lens module 130. The bottom portion 106 may be 0.5 inches deep. The camera module 120 may extend from approximately 1.5 inches from the bottom portion 106. The camera module 120 may be implemented as a rotatable ball with a diameter of approximately 2 inches (e.g., 0.5 inches within the bottom portion 106 and 1.5 inches extending from the bottom portion 106). The dimensions of various components of the apparatus 100 may be varied according to the design criteria of a particular implementation.

Figure 3:
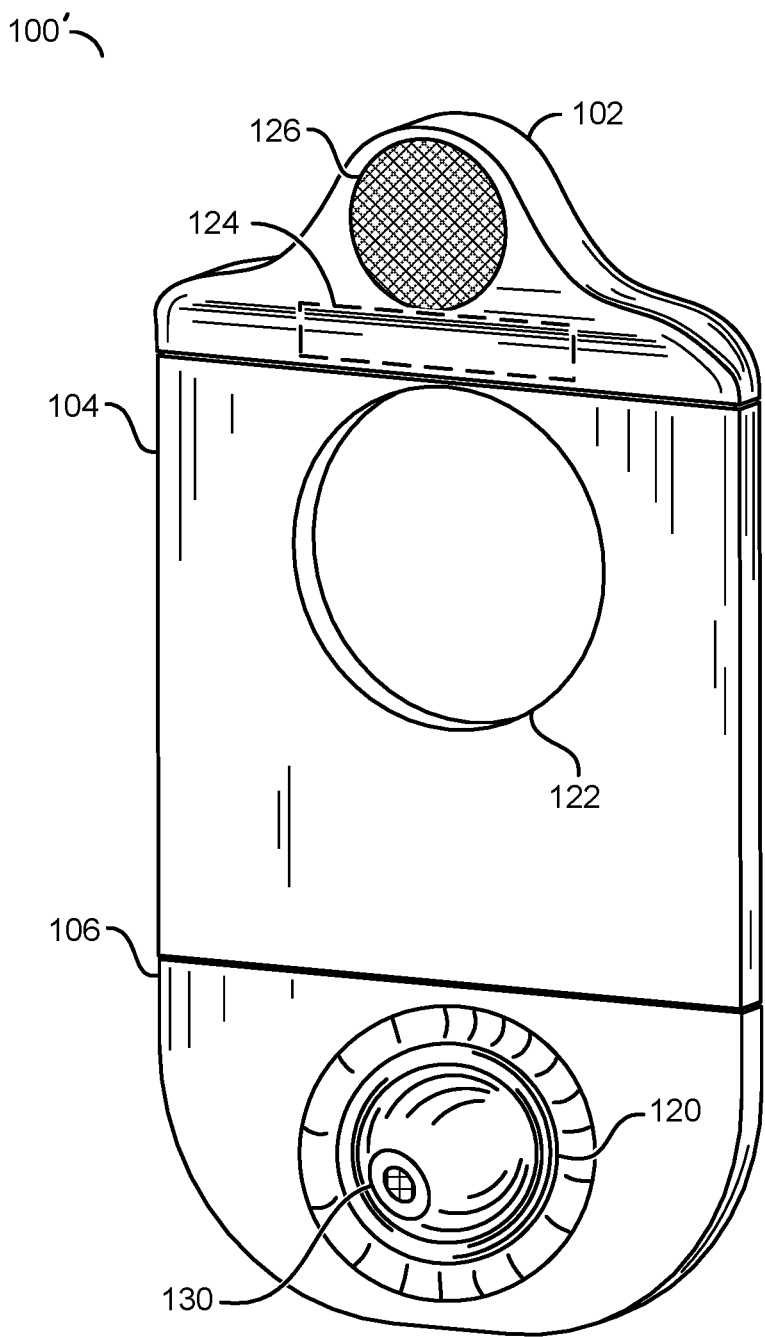
FIG. 3 is a diagram illustrating an example embodiment of the apparatus with a retracted base.

Referring to FIG. 3, an example embodiment of the apparatus 100' with a retracted base is shown. The top telescoping portion 108 may be fully retracted (e.g., not visible). The bottom telescoping portion 110 may be fully retracted (e.g., not visible). Retracting the top telescoping portion 108 and the bottom telescoping portion 110 may reduce a length of the apparatus 100 to a minimum length. When the top telescoping portion 108 is fully retracted, the top portion 102 may be adjacent to the middle portion 104. When the bottom telescoping portion 110 is fully retracted, the middle portion 104 may be adjacent to the bottom portion 106.

The middle portion 104 may be designed to have a small depth. To reduce the depth of the middle portion 104, the telescoping mechanisms (e.g., the telescoping segments, the brackets, the sliders, etc.) may collapse into the top portion 102 and/or the bottom portion 106. The top portion 102 and/or the bottom portion 106 may have a larger depth than the middle portion 104 to accommodate the telescoping mechanisms. In an example, the telescoping segments of the top telescoping portion 108 may collapse into the top portion 102 when the top telescoping portion 108 is fully retracted. Similarly, the telescoping segments of the bottom telescoping portion 110 may collapse into the bottom portion 106 when the bottom telescoping portion 108 is fully retracted. The telescoping portions may collapse into the top and/or bottom portions to keep the middle portion 104 thin.

The camera module 120 may be embedded in the bottom portion 106 of the apparatus 100. To capture images and/or video of an environment near the apparatus 100, the camera lens 130 has to have a field of view unobstructed by the light fixture 52 (e.g., for a light fixture that hangs down, the camera module 120 should be located below the shade 54). In embodiments where the shade 54 does not obstruct the field of view of the lens 130, the bottom portion 106 may be retracted as shown in FIG. 3. In embodiments where the shade does obstruct the field of view of the lens 130, the bottom telescoping portion 110 may be extended, as shown in FIG. 2, to move the lens module 120 below the shade 54 to provide the lens 130 with an unobstructed field of view.

Various combinations of the placement of the speaker 126 and/or the power adapter 124 may be implemented. The power adapter 124, the speaker 126 and/or other components of the apparatus 100 may be anywhere on the wall-plate apparatus 100 with minimal impact on performance. In one example, the speaker 126 may be placed on the bottom portion 106 to reduce a distance between the microphone and a person speaking when the light fixture 52 is located above a person. Different placements of the components of the apparatus 100 may have very different aesthetics appeal. The placement of the camera module 120 may impact performance. Generally, the camera module 120 may be placed to have a clear field of view.

The location of the components of the apparatus 100 may be varied according to the design criteria of a particular implementation. For example, the power adapter 124 may be in the top portion 102, in the bottom portion 106 and/or next to the electrical junction box 66. In some embodiments, the power adapter 124 may be in the base of the light fixture (e.g., the wall-mount plate 58) and/or the base of a light bulb 80' (as shown in FIG. 1). In another example, the speaker 126 may be on the top portion 102 and/or on the bottom portion 106.

Figure 4:
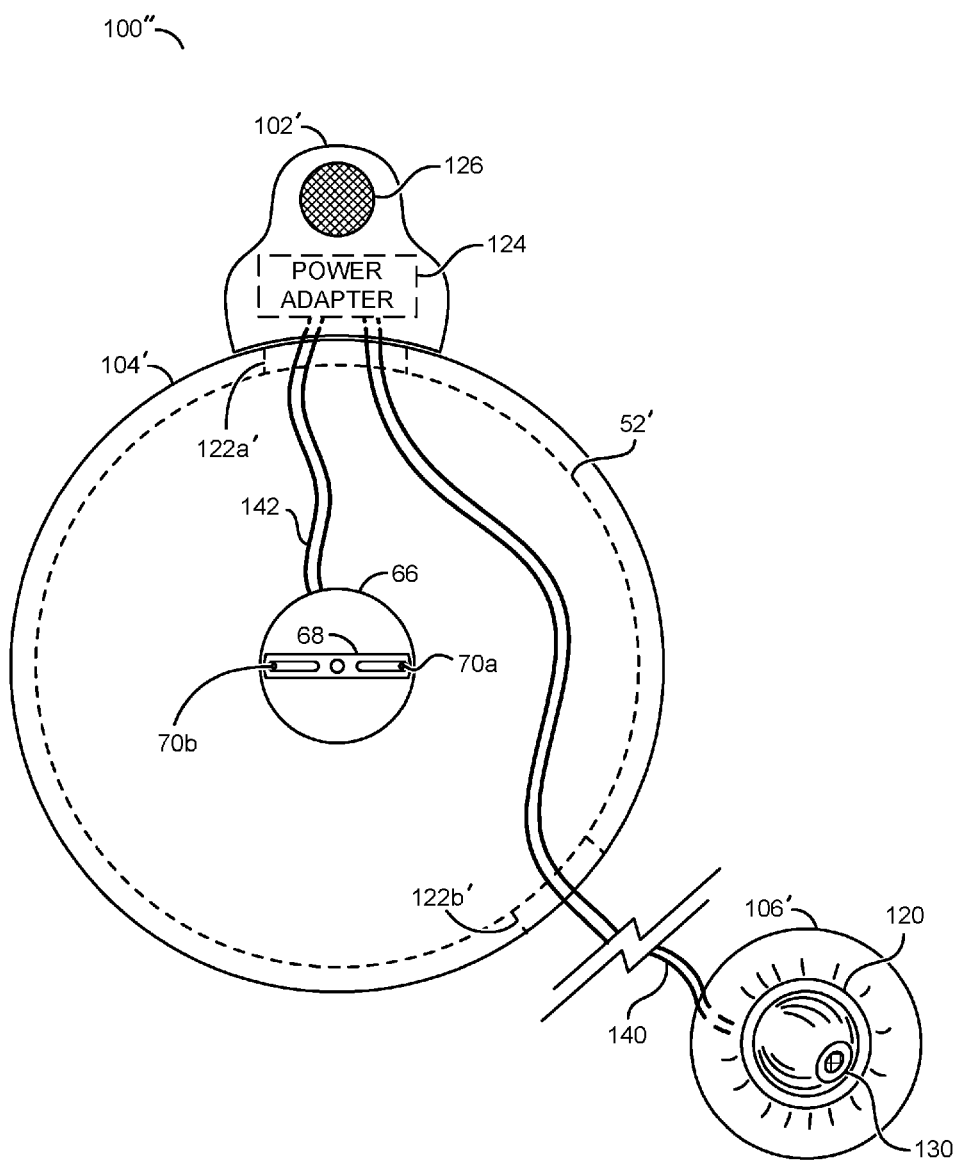
FIG. 4 is a diagram illustrating an alternate example embodiment of the apparatus.

Referring to FIG. 4, an alternate example embodiment of the apparatus 100" is shown. In one example, the apparatus 100" may be configured as an adapter for a dome-style light fixture. In another example, the apparatus 100" may be configured as an adapter for a ceiling light fixture. Generally, ceiling mount light fixtures have small light bulb sockets and/or insufficient space for a socket adapter. To provide a simplified installation, the light bulbs in ceiling light fixtures may be untouched.

The top portion 102' may be external to the ceiling-mounted light fixture 52' (e.g., due to space constraints within the ceiling-mounted light fixture 52'). In the embodiment shown, the top portion 102' may be adjacent to the light fixture 52' and/or the middle portion 104'. In some embodiments, the top portion 102' may be located a distance away from the light fixture 52' and/or the middle portion 104'. In an example, the top portion 102' may be located on a wall and the light fixture 52' may be located on a ceiling. In another example, the top portion 102' may be concealed by another fixture and/or decoration. In some embodiments, the top portion 102' may be approximately 5 inches wide and 3 inches in length. The top portion 102' may taper from 1 inch (at the top) to 0.5 inches (at the bottom to meet the plate adapter 104').

The middle portion 104' may be implemented between the ceiling (e.g., the wall 50) and the light fixture 52'. For example, the middle portion 104' may be an adapter plate. The middle portion 104' may provide openings 122a'-122b' (e.g., wiring channels) between the ceiling junction box 66, the external (e.g., separate) power adapter 124, and/or the external (e.g., separate) camera module 120. The middle portion 104' may fit over the junction box 66. The number, size and/or location of the openings 122a'-122b' may be varied according to the design criteria of a particular implementation.

In some embodiments, the middle portion 104' may be configured to fit a 4 inch diameter hole for the junction box 66. The middle portion 104' may be configured to fit a ceiling mounted light fixture. For example, the plate adapter 104' may be between 10 inches and 20 inches in diameter (e.g., based on the diameter of the ceiling-mounted light fixture 52').

A cable 140 is shown extending from the bottom portion 106' to the power adapter 124. In some embodiments, the cable 140 may pass through the channel 122a' and/or the channel 122b' to extend through the middle portion 104'. In some embodiments, the cable 140 may be routed around the middle portion 104'. For example, the cable 140 may be 20 inches long. In some embodiments, the cable 140 may be retractable. The routing of the cable 140 may be varied according to the design criteria of a particular implementation (e.g., owner preference).

The cable 140 may comprise one or more wires. In an example, the cable 140 may comprise one or more of the adapter wires 112a-112c. The cable 140 may implement low voltage (e.g., 5 volt DC power) wires. For example, the cable 140 may provide DC power from the power adapter 124 to the lens module 120 (or other components of the bottom portion 106').

In some embodiments, the cable 140 may be connected to the power adapter 124 located in the top portion 102', as shown in FIG. 4. In some embodiments, the cable 140 may be connected to the power adapter 124' located in the light bulb 80' via the connector 82'. For example, the cable 140 may be implemented as a USB cable and the connector 82' may be implemented as a USB port to provide the DC power supply to the lens module 120 and/or other components in the bottom portion 106'. When the power adapter 124' is implemented in the smart socket adapter 84', the cable 140 may be routed through the channel 122b' and towards the junction box 66 (e.g., where the smart socket adapter 84' is located).

A cable 142 is shown extending from the power adapter 124 to the junction box 66. The cable 142 may pass through the channel 122a' to extend through the middle portion 104'. In some embodiments, the cable 142 may be retractable. The routing of the cable 142 may be varied according to the design criteria of a particular implementation (e.g., owner preference).

The cable 142 may implement power wiring and/or control signal wires. The cable 142 may transfer an AC power supply to the power adapter 124. In an example, the cable 142 may connect to the power supply wires 72a-72c from the junction box 66 to receive the AC power supply. In some embodiments, the cable 142 may provide a control signal to adjust the light bulb 80 (e.g., turn the light bulb 80 on/off, adjust a brightness of the light bulb 80, adjust a frequency of the light bulb 80, etc.).

The cable 142 from the electrical box 66 to the power adapter 124 may provide an AC power source (e.g., at least one of 120 volts and 240 volts). Generally, the cable 142 may not be exposed. The top portion 102' may be configured to butt against the plate adapter 104' to hide the channel 122a' and the high voltage cable 142 from the junction box 66 without exposing the high voltage cable 142.

For ceiling mounted light fixtures, such as the ceiling-mounted light fixture 52', the apparatus 100' may be separated into three components. For example, the components of the apparatus 100' may be removably connected. One component may provide the thin plate adapter 104' with a size (or diameter) dependent on a size of the ceiling-mounted light fixture 52'. The second component may be the top portion 102'. The top portion 102' may implement the power adapter 124 and, optionally, the speaker 126. The top portion 102' may butt against the thin adapter plate 104' for power wiring and signal wiring (e.g., the cable 140 and/or the cable 142).

For example, AC power and a control signal for the light bulb 80 may be in a bundle of wires (e.g., the cable 142). The top portion 102' may be curved to fit against the plate adapter 104'. For example, the top portion 102' may be 4 inches wide, 3 inches tall and 1 inch deep. In some embodiments, the AC power wires may be separate from a DC control signal (e.g., the cable 140 may be separate from the cable 142). The third component may be the bottom portion 106 comprising the camera module 120. In an example of the ceiling-mounted light fixture 52', the camera module 120 may be placed anywhere on the ceiling or on a nearby wall. The camera module 120 may receive low voltage power (e.g., DC power source) and control signals from the power adapter module 124 through the cable 140 (e.g., such as USB).

The control signal generated by the camera module 120 may be presented to the power adapter 124 via the cable 140. The power adapter 124 may interpret the control signal to control the light bulb 80 (e.g., turn the light bulb on/off). In an example, the power adapter 124 may send a control signal to the light bulb 80 via the cable 142.

The cable 142 may comprise high voltage AC power (typically 3 wires). The cable 140 may comprise low voltage DC power and control for the lens module 120 and other components of the bottom portion 106 and/or the top portion 102. For (NEC) electrical code, the cables 140 and 142 may be kept separated by a distance (e.g., at least 6 mm). In one example, the cable 140 and/or the cable 142 may be flat. For example, the cable 140 may be a flat USB cable 1.4 mm thin and 4.8 mm wide. In an example, the openings 122a-122b may be 7 mm wide each.

Figure 5:
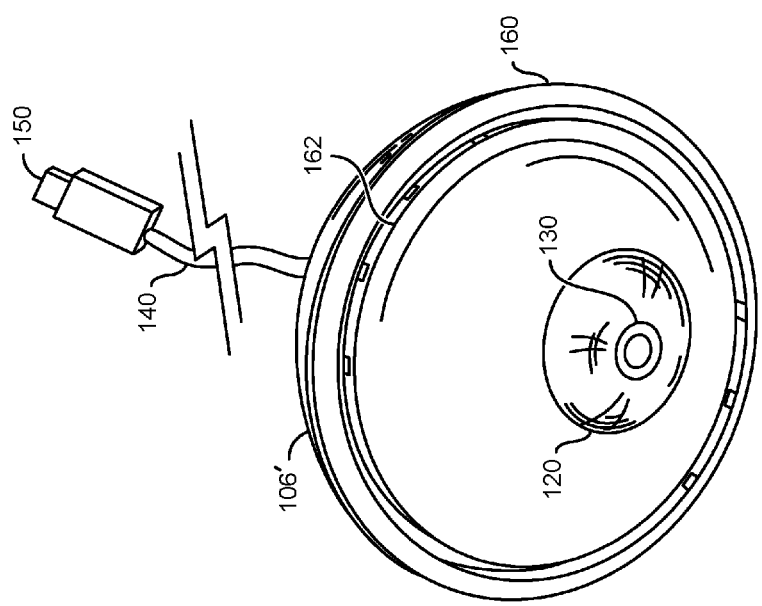
FIG. 5 is a diagram illustrating an example embodiment of a security camera portion of the apparatus.

Referring to FIG. 5, an example embodiment of a security camera portion of the apparatus 100 is shown. The bottom portion 106' may implement a security camera portion of the apparatus 100. The security camera portion 106' is shown having a circular shape. The shape of the security camera portion 106' may be varied according to the design criteria of a particular implementation.

In some embodiments, the security camera portion 106' may not be directly attached to the middle portion 104' of the apparatus 100. For example, the security camera portion 106' may be removably connected to the apparatus 100 using the cable 140. The cable 140 is shown extending from the security camera portion 106'. A connector 150 is shown at one end of the cable 140. In the example shown, the connector 150 may be a male USB plug. In another example, the connector 150 may implement a Thunderbolt plug. Generally, the connector 150 and/or the cable 140 may implement a connection that transmits power (e.g., DC power) and/or data. The type of connector 150 and/or the length of the cable 140 may be varied according to the design criteria of a particular implementation.

The security camera portion 106' may comprise a decorative ring 160 and a faceplate 162. The decorative ring 160 may provide a desirable aesthetic to the security camera portion 106'. For example, the decorative ring 160 may have a metallic finish. The faceplate 162 may provide protection for the components of the security camera portion 106'. The faceplate 162 may be designed to provide openings to improve a functionality of various components of the security camera portion 106'. For example, the faceplate 162 may comprise an opening for the camera module 120. The design and/or style of the decorative ring 160 and/or the faceplate 162 may be varied according to the design criteria of a particular implementation.

Figure 6:
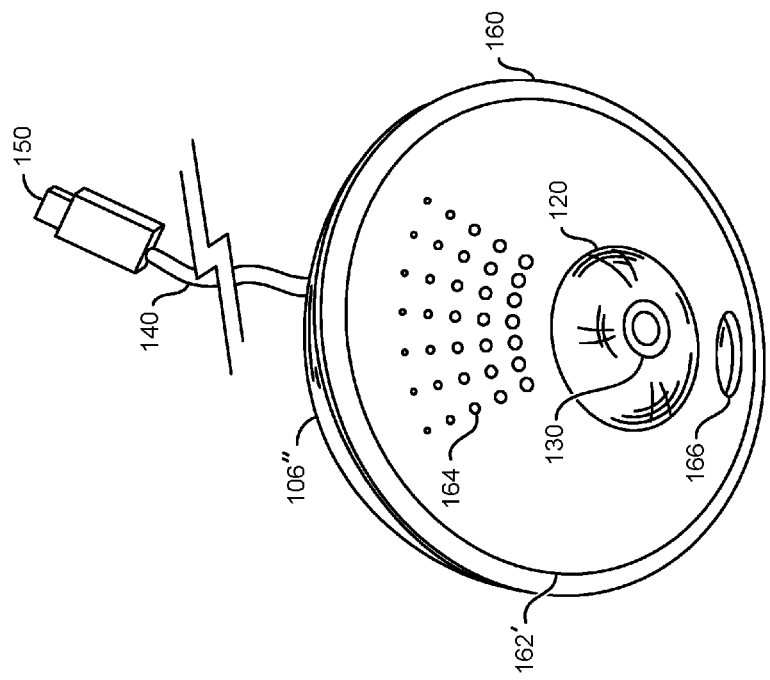
FIG. 6 is a diagram illustrating an alternate example embodiment of the security camera portion of the apparatus.

Referring to FIG. 6, an alternate example embodiment of the security camera portion 106" of the apparatus 100 is shown. The security camera portion 106" may comprise the faceplate 162'. The faceplate 162' may comprise a speaker grille 164 and/or a sensor shield 166. For example, the security camera portion 106" may comprise the speaker 126 and the speaker grille 164 may be located over the speaker 126 and implemented to provide protection to the speaker 126 while allowing audio signals to be sent/received to/from the speaker 126. In another example, the security camera portion 106" may comprise an IR sensor and the sensor shield 166 may provide protection for the IR sensor while allowing IR signals to be sent/received to/from the IR sensor.

The faceplate 162' may be removable. For example, various types of the faceplate 162' may be swapped in based on the functionality and/or components of the security camera portion 106". For example, in embodiments where the speaker 126 is not implemented as part of the security camera portion 106", the speaker grille 164 may not be implemented as part of the faceplate 162' (e.g., the faceplate 162 may be implemented). In another example, in embodiments where the sensor is not implemented as part of the security camera portion 106", the sensor shield 166 may not be implemented. The faceplate 162' may be designed to support various combinations of components for the security camera portion 106".

Figure 7:
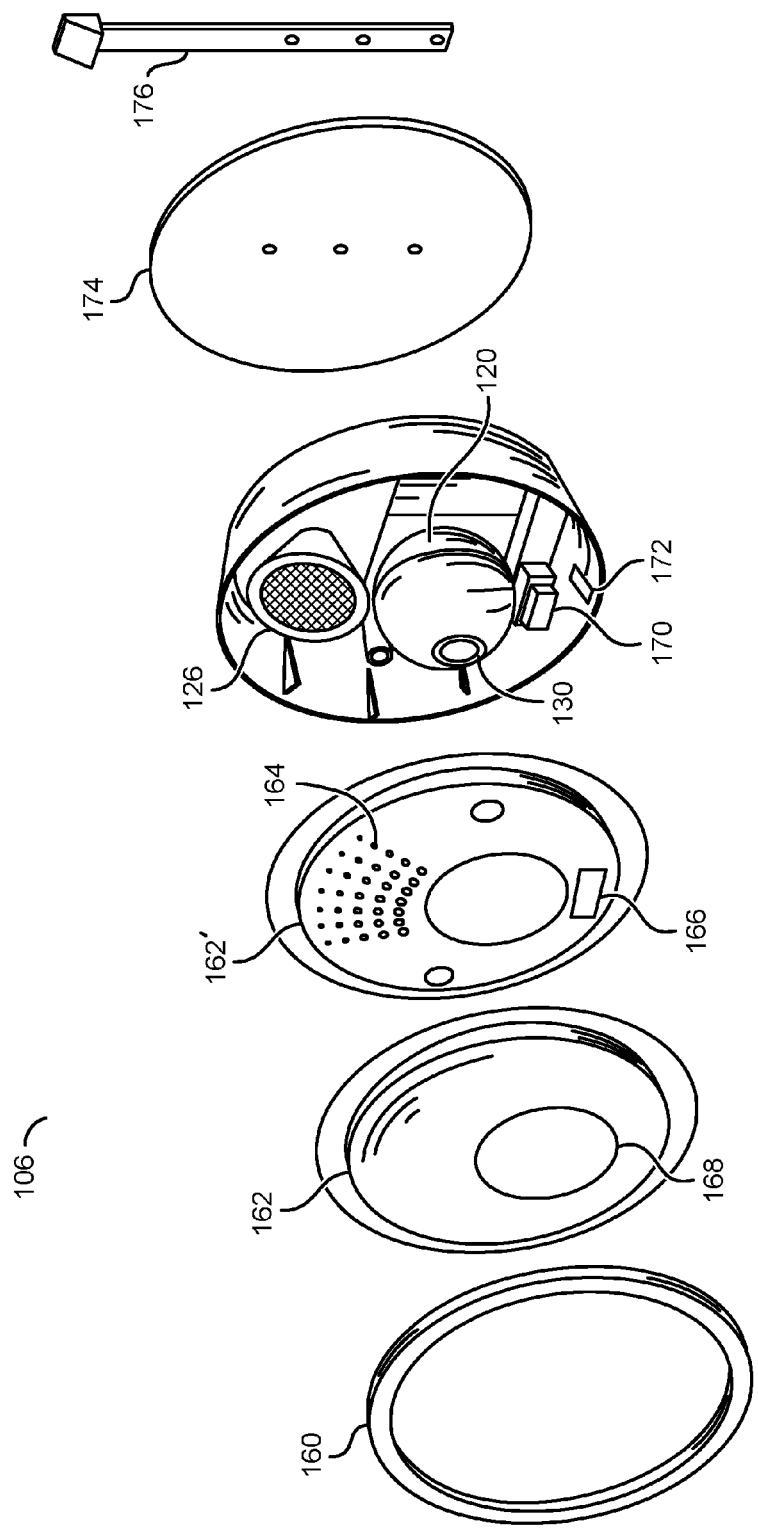
FIG. 7 is a diagram illustrating components of the security camera portion of the apparatus.

Referring to FIG. 7, components of the security camera portion 106 of the apparatus 100 are shown. The security camera portion 106 is shown as an expanded (or exploded) view. The apparatus 100 may be implemented with various removable skins (e.g., shells) as shown in FIGS. 5-6. The faceplate (or skin) 162 and/or the alternate skin 162' may cover up the components of the security portion 106. The skin 162 and/or the skin 162' may be painted with standard house paint to blend the apparatus 100 with the wall 50 or the ceiling and/or to enable a desired aesthetic.

The decorative ring (or trim) 160 may connect to the faceplate 162. Two faceplates (e.g., 162 and 162') are shown. One of the faceplates 162 and 162' may be selected. An extra set of rings 160 and/or faceplates 162 may be provided (e.g., various colors, finishes, shapes, etc.). The faceplate 162 may have an opening 168 to accommodate the lens module 120. The faceplates 160 and/or 162 may implement a weatherproof design. For example, the faceplates 160 and/or 162 may withstand rain, snow, humidity and/or house maintenance year-round.

The lens module 120 and additional components, such as the speaker 126, a sensor 170 and/or a module 172, may be implemented within (or partially within) the security camera portion 106. For example, the sensor 170 may implement an IR sensor. In another example, the module 172 may be a wireless communications module. Other components may be implemented (e.g., a microphone, circuit boards, processors, memory, etc.). The faceplate 162 may provide protection for the components housed in the security camera portion 106.

The apparatus 100 may have an industrial design with the paintable faceplate 160 (or 162) and/or changeable decorative rings 160. A base-plate 174 may be implemented. The base-plate 174 may be implemented to secure (or mount) the security camera portion 106 to the wall 50. For example, the base-plate 174 may comprise holes to removably connect to the wall 50 and removably connect to the security camera portion 106.

A hook 176 may be provided to hook to the bottom of the light fixture 52 and/or the middle portion 104. In an example, the hook 176 may connect to the base-plate 174. The hook 176 may be implemented to cover (or partially cover) the cable 140 extending from the security camera portion 106 to the junction box 66, the top portion 102 and/or the smart socket adapter 84'. The cable 140 may be implemented as a flat and thin USB cable configured to connect 3 wires (e.g., 5V, Gnd, GPIO) to the smart security camera portion 106 and/or the power adapter 124. The bulb 80' may be implemented as an LED bulb with a USB socket (or port) 82'. For example, the bulb 80' may be an A-19 bulb with a USB socket. Temporarily installing the security camera portion 106 may be as easy as changing a light bulb. The control power adapter 124 may be inside and/or outside a cavity of the wall plate 58.

The lens module 120 may be configured to capture video data from a nearby (or surrounding) environment. The lens module 120 and/or components of the security camera portion 106 may be configured to process the video data, store the video data and/or transmit the video data (e.g., via wireless communications implemented by the security camera portion 106). In one example, the lens module 120 may be configured to provide a high-definition video stream (feed) to capture an event (e.g., a visitor arriving, an animal detected, motion, etc.). In another example, the lens module 120 and/or other components of the security camera portion 106 may be configured to perform analysis on the captured video to determine events and/or detect objects (e.g., detect visitors, detect behavior of visitors, detect animals, detect delivered packages, etc.). The lens 130 may be a wide-angle lens. The lens module 120 may be adjustable (e.g., rotatable) to adjust the direction of the lens 130.

The speaker 126 may comprise a built-in microphone and/or a high-fidelity speaker. The speaker/microphone 126 may be implemented to enable clear audio communication. For example, a visitor may speak to the speaker/microphone 126 and a homeowner may use a smart phone to talk remotely (e.g., the speaker 126 may output the voice of the homeowner speaking to the smart phone). Control signals from the power adapter 124 and/or the camera module 120 may be configured to enable the speaker 126 to sound an alarm (e.g., a 100 dB tone). For example, the alarm may be enabled when the lens module 120 detects an unwanted visitor.

The sensor 170 may implement a passive infrared sensor (PIR). The PIR sensor 170 may be configured to detect changes in motion. In an example, the motion changes detected by the PIR sensor 170 may be configured to control an activation of the light bulb 80 and/or the camera module 120. For example, the lens module 120 may begin recording when the PIR sensor 170 detects motion.

The security camera portion 106 may further comprise the wireless communications module 172. In one example, the wireless communications module 172 may implement a Wi-Fi communications protocol. In another example, the wireless communications module 172 may implement a Bluetooth communications protocol. The wireless communications module 172 may be configured to communicate data (e.g., video data captured by the lens module 120) to a local and/or wide area network (e.g., the internet, a cloud storage service, a network storage drive, etc.). In some embodiments, the wireless communications module 172 may be configured to communicate control signals to the smart socket adapter 84'.

The wireless communications module 172 may be configured to communicate with a user device (e.g., a smart phone, a tablet computer, a desktop computer, etc.). For example, the communications module 172 may be paired with a smart phone to enable a user to provide input to the security module portion 106 (e.g., provide control signals to remotely turn the light bulb 80 on/off, to adjust settings for a timer feature that schedules the light bulb 80 to turn on at dusk and off at dawn, etc.) and/or receive video captured by the lens module 120 (e.g., a clear high-definition live video feed). In another example, the wireless communications module 172 may be configured to provide push notifications to the smart phone (e.g., to alert a user when a visitor is detected). The type of data communicated and/or the communication protocol implemented may be varied according to the design criteria of a particular implementation.

Figure 8:
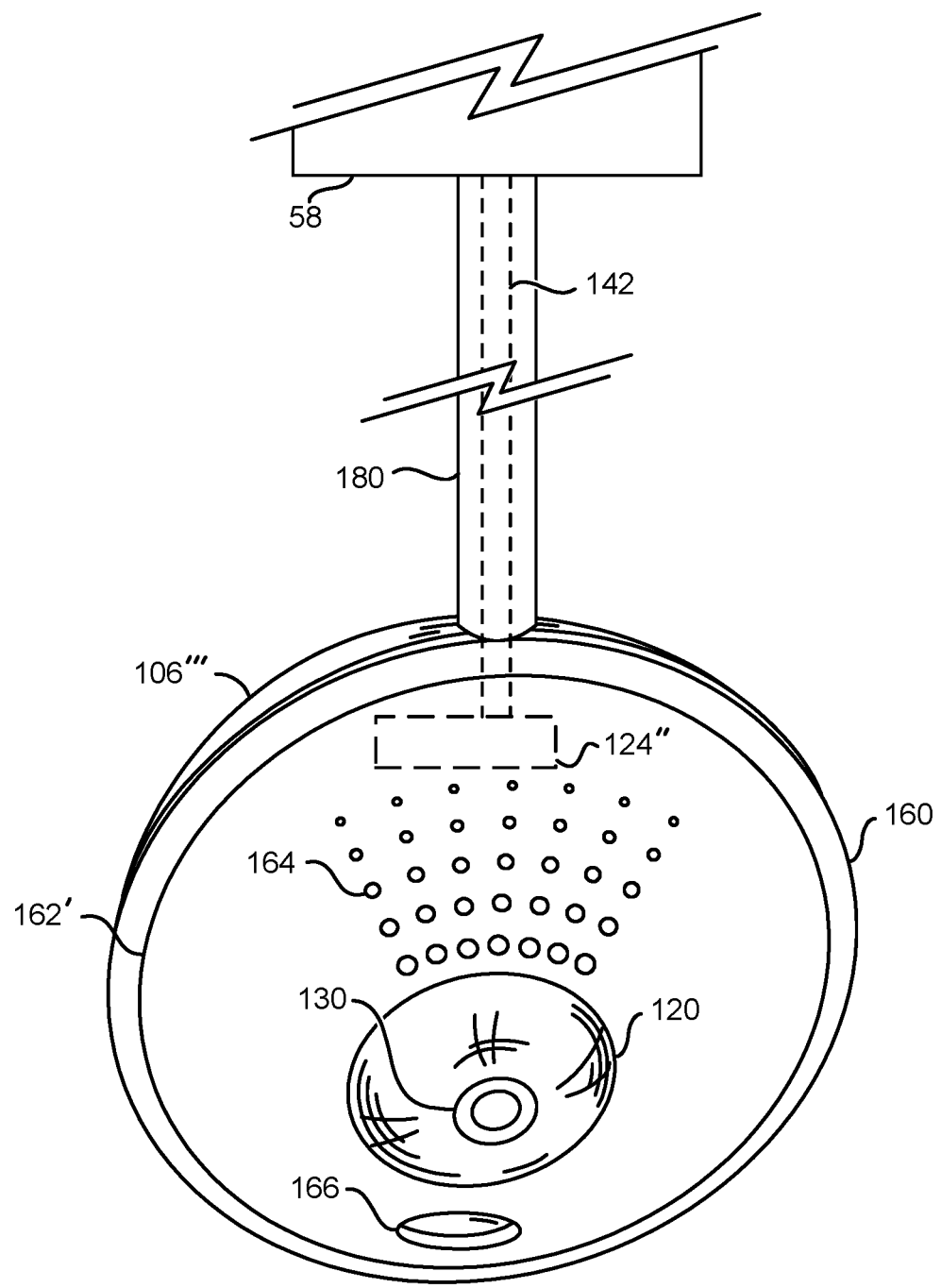
FIG. 8 is a diagram illustrating an example of a combined power adapter and camera module portion of the apparatus.

Referring to FIG. 8, an example of a combined power adapter portion and camera module portion 106''' of the apparatus 100 is shown. The security camera portion 106''' is shown comprising the lens module 120, the decorative ring 160, the faceplate 162' and the power adapter 124". In some embodiments, the power adapter 124" may be implemented within the security camera portion 106'''. With the power adapter 124" implemented in the security camera portion 106''', the cable 140 may not need to be routed externally to the security camera portion 106''' (e.g., the components that need a DC power supply may all be within the security camera portion 106'''). A cable providing the DC power from the power adapter 124" may be within the security camera portion 106'''.

The power adapter 124" in the security camera portion 106''' may connect to the power supply source (e.g., the junction box 66). For example, the cable 142 may transfer the power supply source from the junction box 66 to the power adapter 124". A portion of the cable 142 is shown within a metal tube 180. The metal tube 180 may be an armored metal tube. For example, the metal tube 180 may be implemented to comply with local electrical codes.

High voltage wires may be exposed when "armored" with metal tubes (e.g., the metal tube 180 may be as thin as 1 mm and have a 4 mm exterior diameter). The metal tube 180 is shown providing protection to the cable 142. The cable 142 is shown extending from the power adapter 124" in the security camera portion 106''', through the metal tube 180 and to the base 58. One advantage of implementing the security camera portion 106''' is one fewer box (e.g., no separate power adapter) to install and a disadvantage may be that the security camera portion 106''' may be bigger and the armored metal tube 180 is big and may not be aesthetically desirable.

Figure 9:
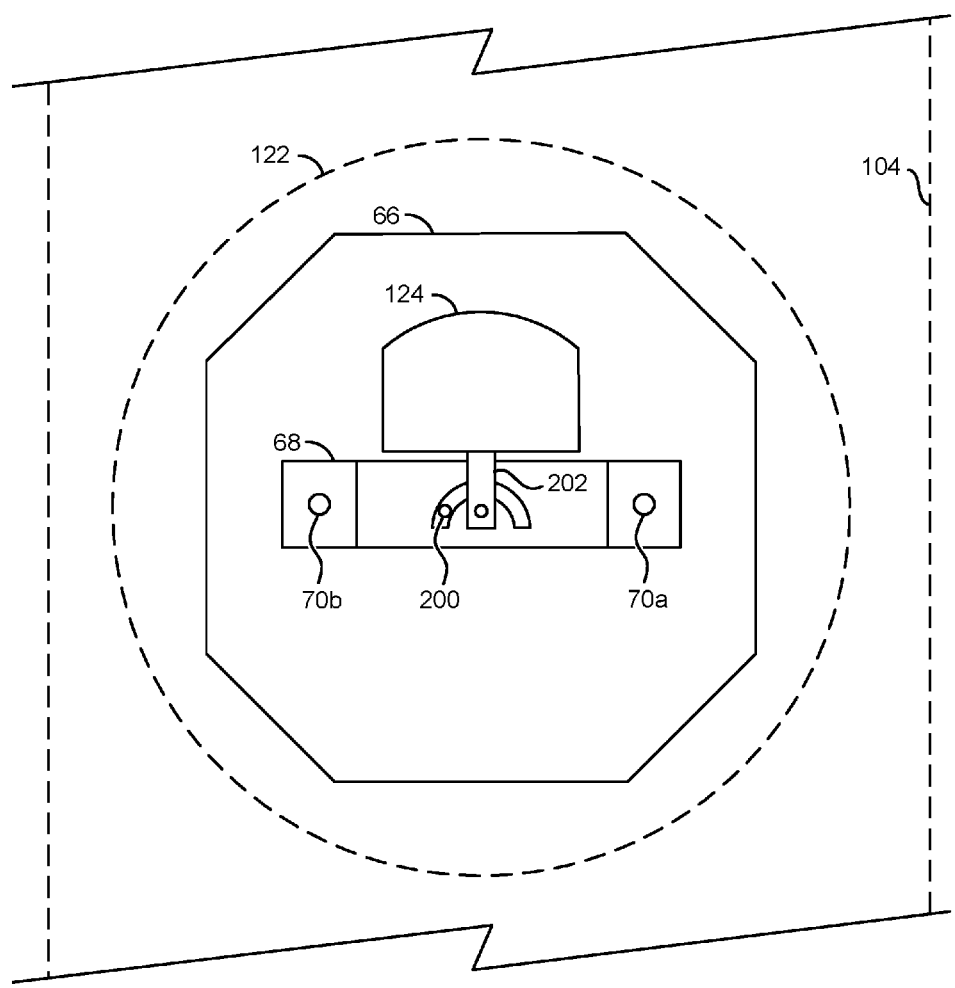
FIG. 9 is a diagram illustrating an alternate mounting of the power adapter portion of the apparatus.

Referring to FIG. 9, an alternate mounting for the power adapter 124 is shown. The middle portion 104 is shown installed over the junction box 66. The opening 122 may allow a channel (or path) through the middle portion 104 of the apparatus 100 to the junction box 66 (e.g., for access to wiring). In some embodiments, the power adapter 124 may be implemented within the junction box 66. Installing the power adapter 124 in the junction box 66 may allow for a short run of wiring from the AC power supply to the power adapter 124. Installing the power adapter 124 in the junction box 66 may reduce a size of the apparatus 100.

If the junction box 66 is large enough to be compliant with NEC code and/or UL requirements, the power adapter 124 may be located inside the junction box 66. A pin (or fastener) 200 and a mounting bracket 202 may be implemented to easily mount the power adapter 124 to the mounting bracket 68 in the junction box 66. The mounting bracket 202 may be implemented as an L shape. The pin and/or fastener 200 may be implemented to adjust the positioning of the power adapter 124.

Figure 10:
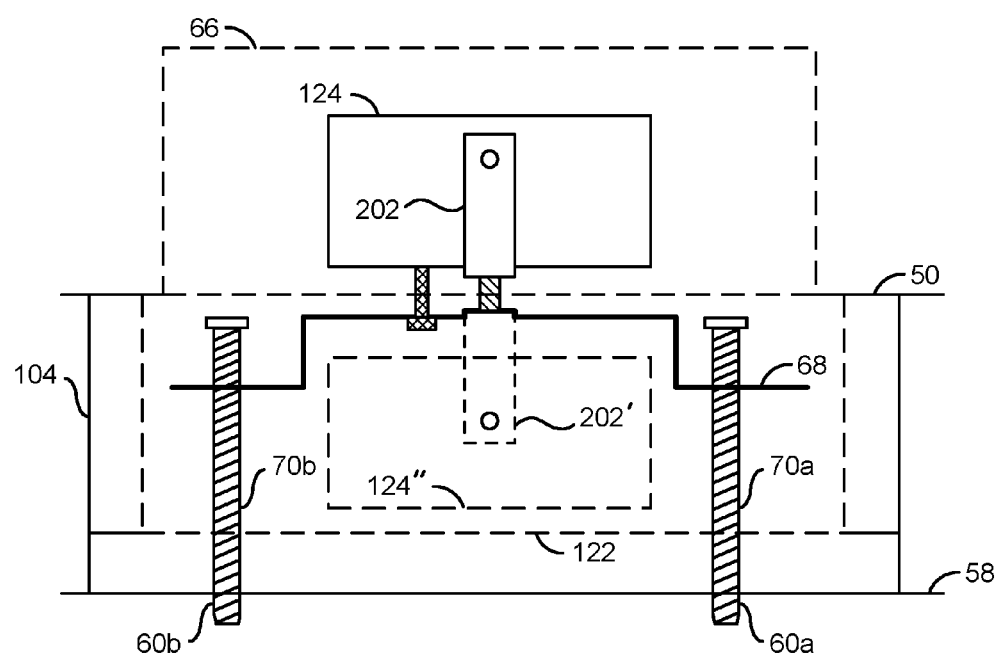
FIG. 10 is a diagram illustrating mounting options for the power adapter portion of the apparatus.

Referring to FIG. 10, mounting options for the power adapter 124 near the electrical box 66 is shown. The middle portion 104 of the apparatus 100 is shown installed against the wall 50 and in front of the junction box 66. The bracket 68 and the mounting screws 70a-70b are shown in the opening 122 of the middle portion 104. The wall plate 58 is shown installed against the middle portion 104. The mounting screws 70a-70b are shown passing through the wall plate 58.

In one example, a bottom view of the power adapter 124 is shown. The bottom view shows the L shaped mounting bracket 202 providing support for the power adapter 124. The power adapter 124 is shown within the electrical box 66.

In an embodiment with an alternate mounting option, the power adapter 124" may be located outside (e.g., in front of) the electrical box 66. The alternate location for the power adapter 124" is shown in between the mounting screws 70a-70b. The power adapter 124" may be in front of the electrical box 66 but within the opening 122 of the middle portion 104 and/or the wall plate 58. The mounting bracket 202 may be rotated and/or fastened in a different configuration to the bracket 68 to provide support for the power adapter 124". The thickness of the middle portion 104 may be large enough to accommodate the thickness of the power adapter 124".

Figure 11:
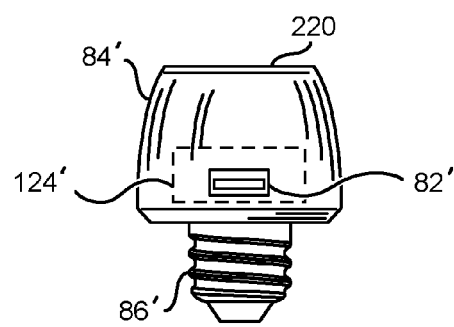
FIG. 11 is a diagram illustrating an example socket adapter.

Referring to FIG. 11, the smart socket adapter 84' is shown having the power adapter 124'. The smart socket 84' may comprise the connector 86'. The connector 86' may be implemented as a screw-in base. The connector 86' may have similar implementation as a screw-in base for standard light bulbs. The connector 86' may receive an AC power supply from an electrical connection to the light fixture 52. In one example, the connector 86' may be a connector for an E26 socket. The size of the screw-in-base 86' may be varied according to the criteria of a particular implementation. For example, the connector 86' may be a male connector for a female receptacle in the light fixture 52.

The smart socket 84' may comprise an adapter connector 220. The adapter connector 220 may be implemented as a screw-in socket adapter. The socket adapter 220 may have a similar implementation as a screw-in base for standard light bulbs. The adapter connector 220 may pass through the AC power supply to the light bulb 80'. For example, the adapter connector 220 may implement an E26 socket. The size of the screw-in-base adapter 220 may be varied according to the criteria of a particular implementation. For example, the adapter connector 220 may be a female socket for a male connector of the light bulb 80.

Another alternate location for the power adapter 124' is in the light bulb socket 84'. Implementing the power adapter 124' in the smart socket adapter 84' may avoid a need for wiring high voltage AC wires (e.g., the AC cable 142). The opening 122 of the middle portion 104 may provide a thin cable channel for the low voltage cable 140 to connect to the smart light bulb socket 84' inside the light fixture 52. For example, the DC cable 140 may be connected to the port 82'. The DC cable 140 may be routed outside the wall plate 58 at the top to hide the cable 140 from view.

The connector 86' may use an electrical connection to receive the AC power supply from the light fixture 52, similar to a standard light bulb implementation. The smart socket adapter 84' may pass the AC power supply received by the connector 86' through to the adapter connector 220. The adapter connector 220 may provide the AC power supply to the light bulb 80. The power adapter 124' may convert the AC power supply to a low voltage (e.g., DC) power supply. The power adapter 124' may present the low voltage power supply to the port 82'.

Figure 12:
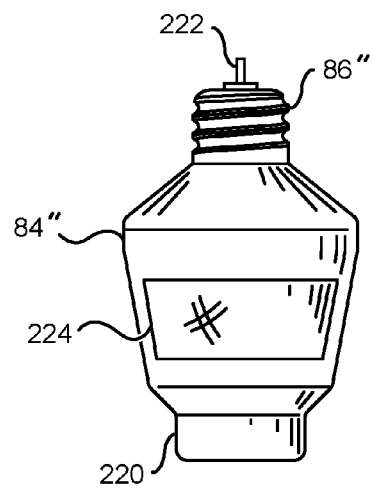
FIG. 12 is a diagram illustrating an alternate embodiment of a socket adapter with a spring loaded contact.

Referring to FIG. 12, an alternate embodiment of the smart socket adapter 84" with a spring loaded contact 222 is shown. Generally, light fixtures are designed to have the light bulb centered with respect to the lamp shade 54. The socket adapter 84" may be configured to limit an amount of extra height (e.g., a height of 12 mm) caused by installing the socket adapter 84". The spring loaded contact 222 may be implemented on the connector 86'. The spring loaded contact 222 may be implemented to allow the smart socket adapter 84" to orient the port 82' at any angle and maintain a connection to the cable 140.

In some embodiments, the smart socket adapter 84" may comprise a module 224. The module 224 may be a wireless communications module (e.g., implementing communication protocols for Wi-Fi, Bluetooth, Zigbee, etc.). In an example, the communication module 224 may be configured to implement a wireless connection to receive control signals from the security camera portion 106 (e.g., transmitted by the wireless communications module 172). The control signals may be configured to control the light bulb 80 (e.g., turn the light bulb 80 on/off, control an intensity of the light bulb 80, adjust a color of the light bulb 80, adjust a frequency of the light bulb 80, etc.). In another example, the communication module 224 may be configured to send data to the wireless communications module 172 of the security camera portion 106 (e.g., to provide a status of the light bulb 80 such as whether the light is on or off). In some embodiments, the communication module 224 may be implemented for the smart socket adapter 84" instead of the port 82'. In some embodiments, the communication module 224 may be implemented in addition to the port 82' (e.g., the port 82' may be implemented to provide a DC power supply and the communication module 224 may be used for the communication of the control signals). The communication protocol(s) implemented by and/or the type of data transmitted using the communication module 224 may be varied according to the design criteria of a particular implementation.

Figure 13:
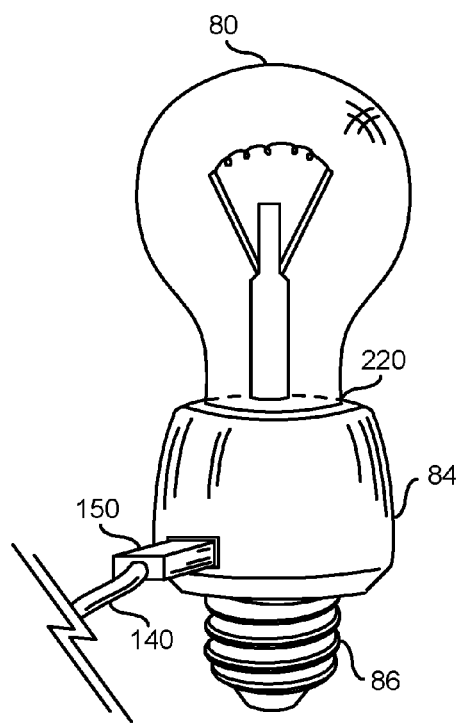
FIG. 13 is a diagram illustrating an example embodiment of a socket adapter with a light bulb.

Referring to FIG. 13, an example embodiment of the socket adapter 84 is shown connected to the light bulb 80. The connector 150 (e.g., a USB cable) is shown plugged into the port 82. The light bulb 80 is shown connected to the adapter connector 220. In one example, the light bulb 80 may be implemented as an incandescent light bulb. In another example, the light bulb 80 may be implemented as a LED light bulb.

Connecting the light bulb 80 to the smart socket adapter 84 may increase an amount of space occupied by the light bulb 80. For example, the height of the smart socket adapter 84 may be added to the height of the light bulb 80. The height of the smart socket adapter 84 may be constrained to a size of the male connector of the light bulb 80.

Figure 14:
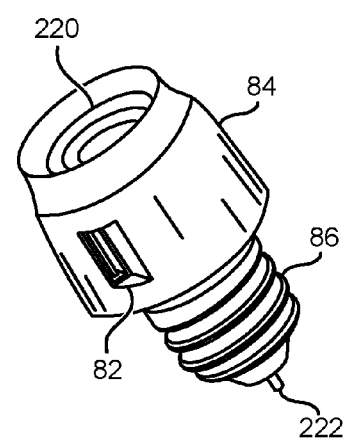
FIG. 14 is a diagram illustrating an alternate view of a socket adapter with an inset port.

Referring to FIG. 14, an alternate view of the socket adapter 84 with an inset port is shown. The port 82 is shown partially inset on the smart socket adapter 84. Arranging the port 82 to be inset may allow the connector 150 to connect relatively flat against a side of the socket adapter 84 (e.g., prevent the connector 150 from sticking out). The alternate view shows the female socket on an inner portion of adapter connector 220. In one example, the inner portion of the adapter connector 220 may be threaded to accept the threading of the male connector of the light bulb 80. In another example, the inner portion of the adapter connector 220 may be a cavity for accepting male prong connectors of the light bulb 80. The type of adapter connector 220 implemented may be varied according to the design criteria of a particular implementation.

Figure 15:
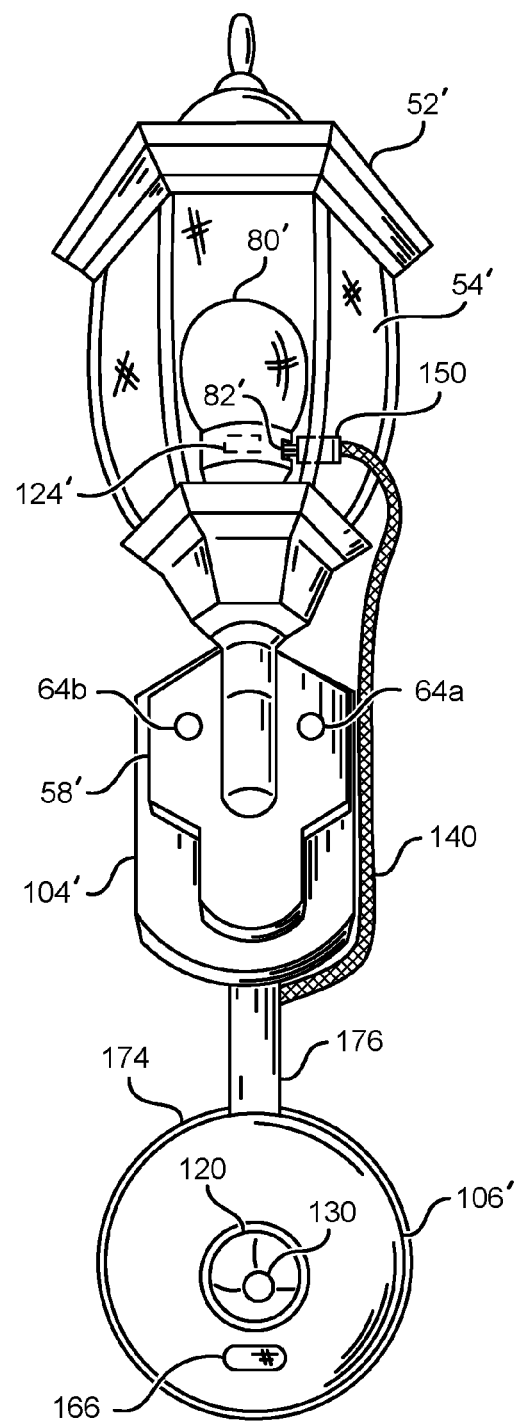
FIG. 15 is a diagram illustrating a retrofit embodiment for the security camera portion of the apparatus.

Referring to FIG. 15, a retrofit embodiment for the security camera portion of the apparatus 100 is shown. In the example shown, the light fixture 52' is shown as an up-hanging light fixture (e.g., a sconce). Similar implementations may be used for down-hanging light fixtures. Generally, for the light fixture 52', the shade 54' obstructing the view of the camera module 120 is not a concern. The wall-plate 58' is shown attached on top of the plate adapter 104'. The style of the wall-plate 58' may leave a portion of the plate adapter 104' exposed. In some embodiments, the wall-plate 58' may cover the entire plate adapter 104'. The decorative caps 64a-64b are shown on the fixture base 58'. The decorative caps 64a-64b may cover the mounting screws 70a-70b that are supporting the fixture base 58' and/or the plate adapter 104'.

The security camera portion 106' may be configured to removably connect to a separate base plate 174 and/or the middle portion 104'. For example, the security camera portion 106' may be 3 inches in diameter. The middle portion 104' may be mounted to the wall 50 underneath the base 58' of the light fixture 52'. The security camera portion 106' may be configured to snap into the middle portion 104'. For example, a set-screw may be used to secure the bottom portion 106' to the adapter plate 104'.

The hook 176 may be provided to hook to the bottom of the fixture base 58' and/or the middle portion 104' of the apparatus 100. The hook 176 may cover a portion of the cable 140. The cable 140 may be implemented as a flat and thin USB cable configured to connect 3 wires (e.g., 5V, Gnd, GPIO) to the smart security camera portion 106' and the DC supply port 82'. For example, the cable 140 may be 1.4 mm thin and 4.8 mm wide. The cable 140 may be routed along the side of the fixture base 58' and/or the middle portion 104' to obscure the cable 140 as much as possible. The bulb 80' may be implemented as an LED bulb with the USB socket (or port) 82'. For example, the bulb 80' may be an A-19 bulb with a USB socket. Temporarily installing the camera module 120 (e.g., the bottom portion 106') may be as easy as changing a light bulb.

In some embodiments, the light bulb socket 84' (e.g., located within the shade 54') with the power adapter 124' and the USB socket 82' may be implemented. In another embodiment, the LED light bulb 80' may comprise the power adapter 124'. The connector 82' may provide a DC power supply from the power adapter 124' in the light bulb 80'.

The power adapter 124' may connect to AC wires from the electrical box 66 and/or provide controlled power to the light fixture (e.g., the control signal from the camera module 120 to control the light bulb 80). The security camera portion 106' may comprise a wired connection to the power adapter 124' for DC power (e.g., the low voltage used by the camera module 120). The camera module 120 may provide control signals to the power adapter 124'. The control signals may be implemented to control the light bulb 80'. For example, the control signals may be used to turn the light bulb 80' on/off, control a color change of the light bulb 80', control an intensity of the light bulb 80' (e.g., dim the bulb), control a frequency of the light bulb 80', etc. In some embodiments, the USB cable 140 may provide a connection to the power adapter 124'.

The camera module 120 may be placed just below the previously installed light fixture 52 with an USB-like cable 140 that runs into the light fixture 52 to get power (e.g., from the light bulb 80' with the power adapter 124' and USB connector 82') and/or the smart socket adapter 84' with the power adapter 124' and the USB socket 82'. For example, the security camera portion 106' may be positioned below a level of the shade 54' of the light fixture 52' (e.g., to prevent the shade 54' from obstructing the view of the camera module 120). For the temporary installation the user does not need to remove the light fixture 52 from the junction box 66 and rewire high voltage wires (e.g., installation is as simple as changing a light bulb, connecting to the camera module 120 and mounting the security camera portion 106' to the wall 50). The security camera portion 106' may be mounted to the wall using the hook 176, an adhesive (e.g., glue tape such as 3M tape) and/or screws.

Figure 16:
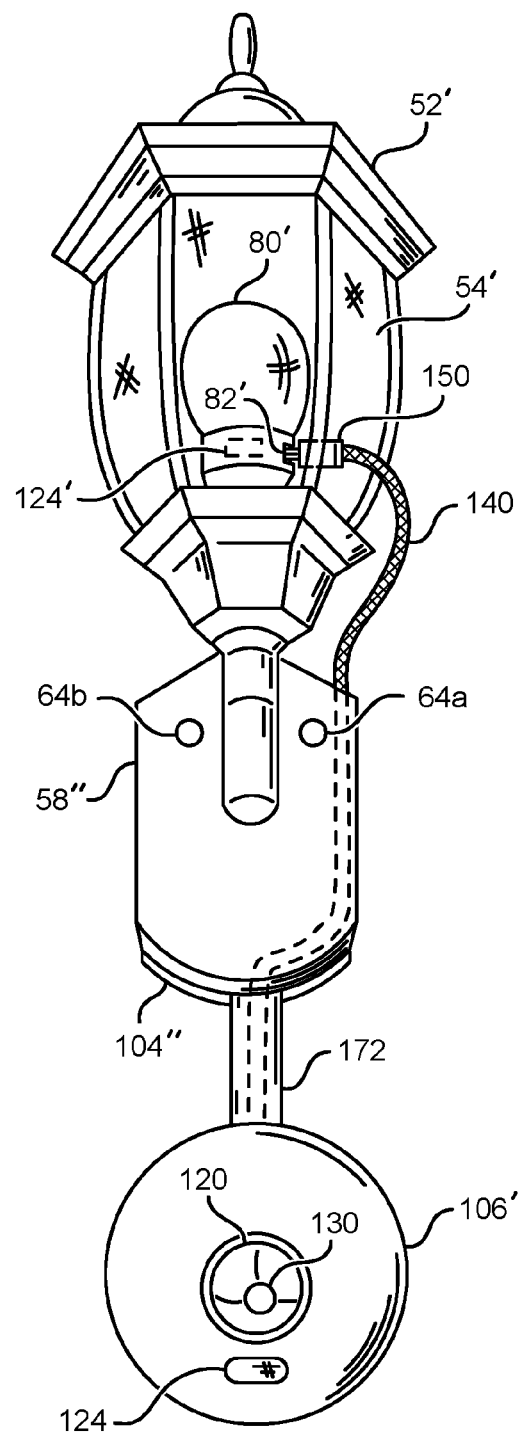
FIG. 16 is a diagram illustrating an alternate retrofit embodiment for a camera module portion of the apparatus.

Referring to FIG. 16, an alternate retrofit embodiment for the security camera portion 106' of the apparatus 100 is shown. The fixture base 58" is shown covering the middle portion 104" of the apparatus 100. For example, the middle portion 104" may not be visible when viewing the light fixture 52' head-on. The underside of the middle portion 104" may be visible between the wall 50 and the fixture base 58".

The cable 140 is shown extending from the bottom portion 106', behind the hook 176 to the middle portion 104" and/or the base 58". The cable 140 is shown routed through the base 58" and/or the middle portion 104' extending upwards towards the lamp shade portion 54' of the light fixture 52' (e.g., an upright lamp configuration). Routing the cable 140 through the middle portion 104" may decrease a visibility and/or exposure of the cable 140. The cable 140 may have the connector 150 at one end. The connector 150 may be a USB connector. The USB connector 150 is shown plugging into the port 82' of the light bulb 80'. The light bulb 80' may provide the DC power supply to the components of the bottom portion 106' via the DC cable 140.

Figure 17:
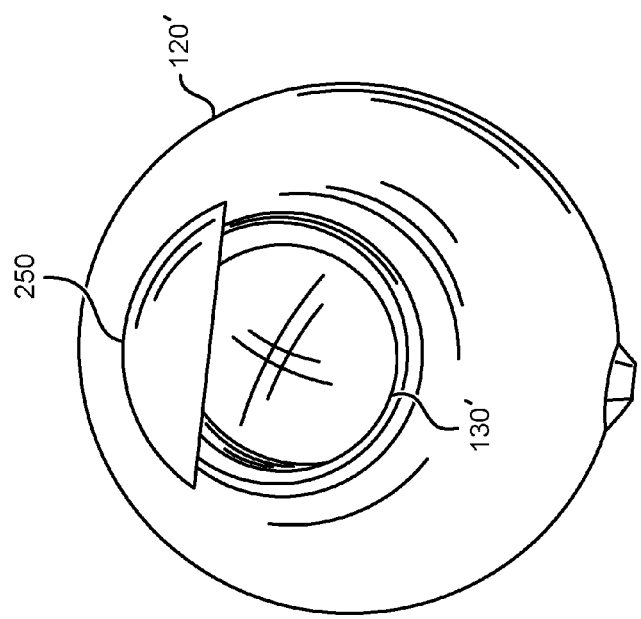
FIG. 17 is a diagram illustrating an example lens hood for a security camera module.

Referring to FIG. 17, an example lens hood for the security camera module 120' is shown. The apparatus 100 may be configured to implement a solution for glare problems at night from the light fixture 52. The solution for the glare problems may be to implement a lens hood 250. The lens module 120' is shown. The lens module 120' may comprise the lens hood 250 over a portion of the lens 130'. The lens hood 250 may reduce an amount of glare captured by the lens module 120'. The lens hood 250 may block stray light to reduce the amount of glare.

The glare problems may be caused by a light source (e.g., the light bulb 80) entering the lens 130'. Some light sources entering the lens 130' may be desirable to capture images of the environment surrounding the apparatus 100. However, stray light sources (e.g., light from the light bulb 80 and/or light reflecting off the shade 54) may cause glare. The lens hood 250 may reduce problems resulting from glare by blocking stray light (e.g., light from above) while allowing light used to generate the video images to enter the lens 130'.

To solve the glare problem at night from the light fixture 52 in front, the visor (or lens hood) 250 may be placed in front of the lens 130'. The lens hood 250 may be designed to take advantage of the pyramidal light cone of the captured images. The desired light captured by the lens 130' may be in the shape of a pyramidal cone projecting into the lens 130'. A bottom edge of the lens hood 250 may have a shape similar to one side of the pyramidal light cone (e.g., to not block the pyramidal light cone). In some embodiments, a light shield (or lens hood) 250 may be implemented at the bottom of the light fixture 52 (e.g., part of the lamp shade 54) to block the stray light from entering the lens 130'.

In some embodiments, a round shape for the lens hood 250 may be implemented that has the same rotational symmetry as the lens 130' and aesthetically matches the round image formed by a photographic lens. However, the round image may result in an undesired crop of the image to a rectangular section. Generally, the lens 250 may not be round to provide improved image capture and/or glare reduction. The accepted light cone that is used to illuminate the frame is pyramidal. At full aperture, going from the lens 130 towards infinity, the cone starts out circular at the front element and converts to a rectangular cross section at some distance. At small apertures, and depending on the design, the cross section of the light cone may be a rectangular shape at a position of the lens 130. The lens hood 250 may take into account the cross section of the light cone. The shape of the lens hood 250 may be varied according to the design criteria of a particular implementation.

Figure 18:
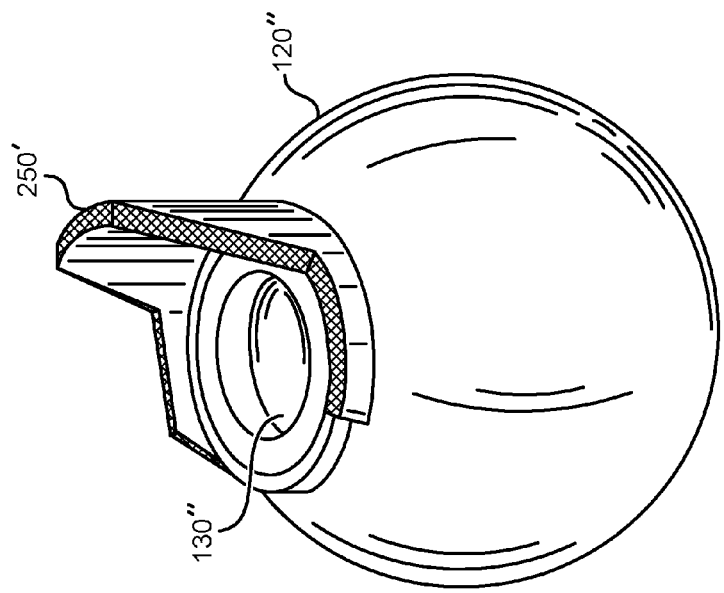
FIG. 18 is a diagram illustrating an alternate example lens hood for the security camera module.

Referring to FIG. 18, an alternate example lens hood for the security camera module 120" is shown. The lens hood 250' may be an alternate design for the solution to the glare problem. The lens hood 250' may extend outward from the lens 130". Both the lens hood 250 and the lens hood 250' may be an effective solution to prevent stray light from entering the lens 130.

Figure 19:
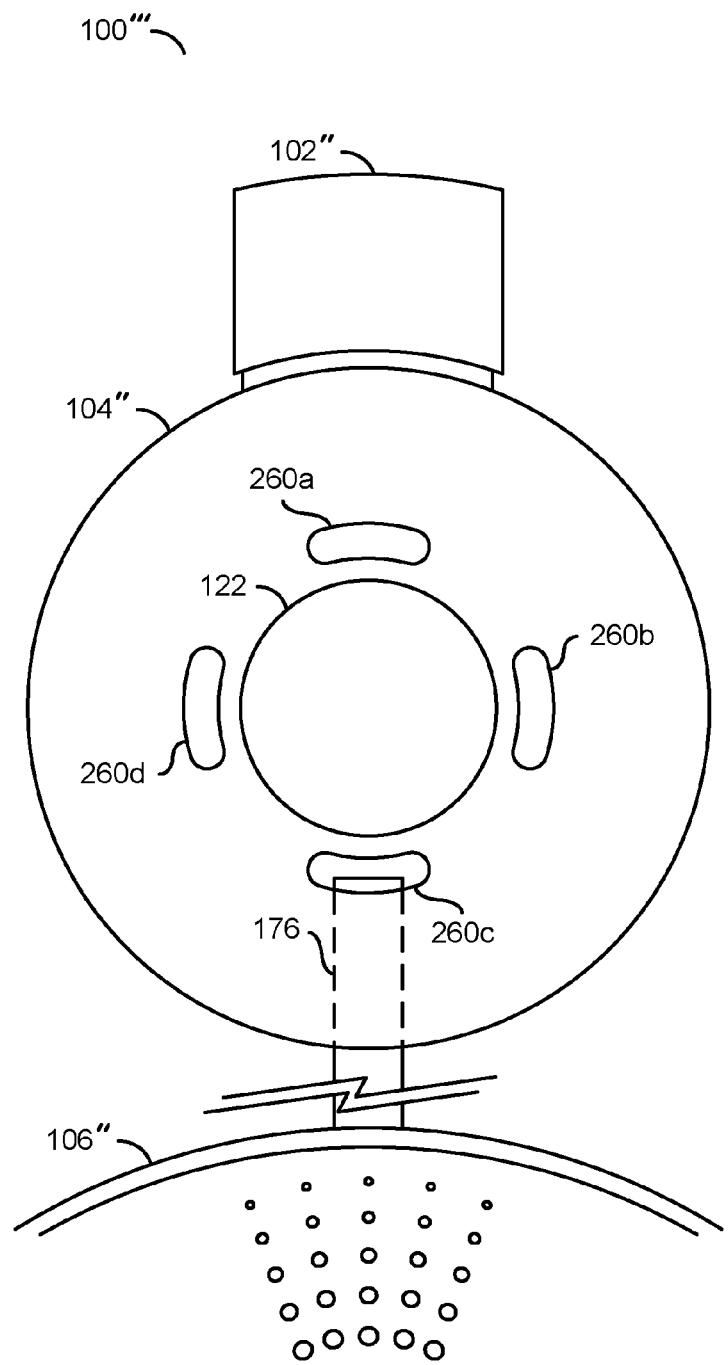
FIG. 19 is a diagram illustrating an alternate embodiment of the wall plate adapter.

Referring to FIG. 19, an alternate embodiment of the wall plate adapter is shown. The apparatus 100''' is shown comprising the top portion 102", the wall plate adapter 104" and the bottom portion 106". In some embodiments, the top portion 102" may comprise the power adapter 124. In one example, the top portion 102" may be attached to the wall plate adapter 104". In another example, the top portion 102" may be removably attached to the wall plate adapter 104". The bottom portion 106" is shown removably attached to the wall plate adapter 104" using the hook 176.

The alternate wall plate adapter 104" is shown as a flat plate. In some embodiments, the wall plate adapter 104" may be a metallic material. In some embodiments, the wall plate adapter 104" may be a plastic material. The type of material used to construct the wall plate adapter 104" may be varied according to the design criteria of a particular implementation.

The wall plate adapter 104" is shown comprising the opening 122 and/or slots 260a-260d. The slots 260a-260d may be used to secure the wall plate adapter 104" to the wall 50. The number, shape and/or arrangement of the slots 260a-260d may be varied according to the design criteria of a particular implementation.

The slots 260a-260d may be sized to allow screws and/or other securing devices to pass through the wall plate adapter 104". For example, the slots 260a-260d may be large enough for a threaded portion of a screw to pass through, but not large enough for a head of the screw to pass through (e.g., the head of the screw may provide support for the wall plate adapter 104"). In some embodiments, the hook 176 may be removably connected to one of the slots 260a-260d. The hook 176 is shown attached to the slot 260c to provide support for the bottom portion 106". In one example, the hook 176 may be behind the wall plate adapter 104". In another example, the hook 167 may hang in front of the wall plate adapter 104".

The hook 176 may be 25 mm wide and 2 mm thick with a 1 mm channel for the cable 140. To mount the security camera portion 106 below the base 58 of the light fixture 52, the hook 176 may be connected (or supported) using set screws designed to clamp to the bottom edge of the fixture base 58 and/or the middle portion 104.

The security camera portion 106" may be mounted to the wall 50 (or the ceiling) using the hook 176, screws and/or glue tape. The security camera portion 106" may be configured to removably connect to a separate base plate (e.g., the base plate 74 as shown in FIG. 7) and the base plate 174 may be mounted to the wall 50. In one example, the security camera portion 106 may be configured to snap into the base plate 174. For example, a set-screw may be used to secure the security camera portion 106 to the base plate 174.

The cable 140 may extend from the power adapter 124. A user may loosen the mounting screws 70a-70b and pull the base 58 of the light fixture 52 from the wall 50 (approximately 3 mm). The user may route the cables 140 and/or 142 through the channel opening 122 of the middle portion 104.

In one example, the middle portion 104 may be inserted from the top of the fixture base 58. The metal hook 176 may be inserted to hang the security camera portion 106. The mounting screws 70a-70b may be tightened to secure the apparatus 100 to the wall 50.

The apparatus 100 may be configured to provide a flexible implementation for installing a smart security light using existing (or previously purchased) light fixtures. The apparatus 100 may comprise the top portion 102 with the speaker 126 and the power adapter 124 housed in the top portion 102. The apparatus 100 may comprise the middle portion 104 to function as an adapter plate. The middle portion 104 may comprise a thin plate with the opening 122 that provides wiring channels. The apparatus 100 may be telescoping to provide an adjustable length at the top and at the bottom. The telescoping top piece 108 between the middle section 104 and the top section 102 may be implemented. The telescoping bottom piece 110 between the middle section 104 and the bottom section 106 of the apparatus 100 may be implemented.

The apparatus 100 may provide easy installation for the security camera 120 by tapping into the existing AC power line (e.g., from the junction box 66) of the standard light fixture 52. Generally, to install a security camera on a wall or a ceiling with the AC power line not exposed involves hiring a licensed electrician (e.g., resulting in a potential cost of over $300). Many homeowners may not tackle running an AC power line inside a wall or in a ceiling. Using the apparatus 100 to tap into the existing AC power line may increase safety and/or encourage homeowners to perform the installation.

The apparatus 100 may comprise the adapter plate 104 with the Internet-connected security camera 120 and/or the 2-way intercom 126. The apparatus 100 may be implemented as a single unit (e.g., as shown in FIGS. 1-3) with adjustable length at the top (e.g., the top telescoping portion 108) and/or at the bottom (e.g., the bottom telescoping portion 110) for the wall-mounted light fixture 52. In some embodiments, the apparatus 100' may be implemented as separate components (e.g., the power adapter portion 102' comprising the power adapter 124, the plate adapter 104', and the bottom portion 106' comprising the camera module 120). For example, the separate component embodiment may be used for the ceiling-mounted light fixture 52' (e.g., as shown in FIG. 4).

The apparatus 100 may be a retrofit design for existing light fixtures. The smart security camera 120 may be implemented with simple key loader (SKL) electronics compatible with smart security camera products that are integrated with a light fixture. In one example, the smart security camera module 120 may be 128 mm in diameter and approximately 25 mm deep. In some embodiments, the power adapter 124 may be moved out to fit in the junction box 66.

The apparatus 100 may work for both wall-mount and/or ceiling-mounted electrical boxes. The camera module 120 may be placed anywhere on the wall with a cable (e.g., USB) to attach to the power adapter 124 in the cavity of the apparatus 100. The bottom portion 106 (e.g., comprising the camera module 120) may be removable from the apparatus 100 (e.g., removably connected). Removing the camera module 120 and/or the bottom portion 106 may allow a user to test out a retrofit installation and/or provide a temporary easy installation. After testing the retrofit, the user may decide to expend the extra effort of installing the apparatus 100.

One alternative implementation is to implement the camera module 120 and the 2-way intercom 126 inside the light fixture 52. The lens/sensor module 120 may be separated out from the bottom portion 106 to mount on the outside of the light fixture 52. Separating out the lens module 120 may provide an unobstructed field of vision. For example, the camera module 120 may be separated out when the bottom telescoping portion 108 does not extend enough to allow the lens module 120 to be located below the shade 54.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a power adapter configured to (i) receive an AC power source, (ii) pass through said AC power source to a light bulb and (iii) generate DC power by converting said AC power source;
   a security camera portion (i) configured to receive said DC power from said power adapter and (ii) comprising a camera module; and
   a socket adapter comprising a first connector, a second connector and a third connector, wherein (i) said camera module is integrated in a cavity of said security camera portion, (ii) said power adapter is within said socket adapter, (iii) said first connector is removably connected to said light bulb and said second connector is removably connected to a light fixture, (iv) said power adapter receives said AC power source from an electrical connection to said light fixture, (v) said security camera portion is configured to connect to said third connector to receive said DC power, (vi) said security camera portion is mounted to a wall, (vii) said camera module is rotatable within said security camera portion to adjust a direction of view and (viii) said socket adapter is not mounted to said wall.

2. The apparatus according to claim 1, wherein said security camera portion is positioned against said wall and below a level of a shade of said light fixture.

3. The apparatus according to claim 1, wherein (i) said security camera portion is configured to generate a control signal to control said light bulb and (ii) said control signal is transmitted using at least one of (a) a wired connection to said third connector of said socket adapter and (b) a wireless connection to said socket adapter.

4. The apparatus according to claim 3, wherein (i) said third connector is a Universal Serial Bus (USB) connector and (ii) said USB connector (a) provides said DC power to said security camera portion and (b) receives said control signal from said security camera portion.

5. The apparatus according to claim 1, wherein said security camera portion comprises a lens hood configured to reduce an amount of glare captured by said camera module of said security camera portion.

6. The apparatus according to claim 5, wherein said lens hood is removably attached to a top portion of said camera module.

7. The apparatus according to claim 5, wherein said lens hood is configured to (i) allow a pyramidal light cone to be accepted by said camera module and (ii) block stray light from entering said camera module.

8. The apparatus according to claim 1, wherein said security camera portion further comprises additional components, said additional components comprising at least one of a 2-way intercom, a wireless communications module and a passive infrared sensor.

9. The apparatus according to claim 1, wherein (i) said security camera portion comprises a skin to cover said security camera portion and (ii) said skin is paintable.

10. The apparatus according to claim 1, wherein said camera module is configured as a wireless, internet-connected security camera.

11. The apparatus according to claim 1, wherein said apparatus is implemented as a retrofit for said light fixture.

12. The apparatus according to claim 1, wherein said security camera portion is mounted using at least one of a hook, an adhesive and screws.

13. The apparatus according to claim 12, wherein said hook is configured to (i) removably connect said security camera portion to said light fixture and (ii) hide a wired connection between said power adapter and said security camera portion.

14. The apparatus according to claim 1, wherein (i) a base plate is configured to attach to said security camera portion to enable said security camera portion to said wall and (ii) said security camera portion is configured to removably connect to said base plate without removing said socket adapter from said light fixture.

15. The apparatus according to claim 1, wherein said camera module is implemented as a rotatable ball.

16. The apparatus according to claim 1, wherein said camera module comprises a lens.

\* \* \* \* \*